US007646371B2

(12) United States Patent
Maki

(10) Patent No.: US 7,646,371 B2
(45) Date of Patent: Jan. 12, 2010

(54) DRIVER CIRCUIT, ELECTRO-OPTICAL DEVICE, AND ELECTRONIC INSTRUMENT

(75) Inventor: Katsuhiko Maki, Chino (JP)

(73) Assignee: Seiko Epson Corporation, Tokyo (JP)

( * ) Notice: Subject to any disclaimer, the term of this patent is extended or adjusted under 35 U.S.C. 154(b) by 775 days.

(21) Appl. No.: 11/436,038

(22) Filed: May 18, 2006

(65) Prior Publication Data

US 2006/0284806 A1 Dec. 21, 2006

(30) Foreign Application Priority Data

Jun. 17, 2005 (JP) ............................ 2005-177639

(51) Int. Cl.
*G09G 3/36* (2006.01)
*G09G 5/00* (2006.01)
*H04N 3/02* (2006.01)

(52) U.S. Cl. .......................... 345/98; 345/92; 345/214; 345/211; 345/213; 348/195

(58) Field of Classification Search ........... 345/92–100, 345/204–214, 690–697; 348/195
See application file for complete search history.

(56) References Cited

U.S. PATENT DOCUMENTS 6,628,274 B1 9/2003 Morita
7,126,596 B1 * 10/2006 Hogan ........................ 345/211
7,477,271 B2 * 1/2009 Maki .......................... 345/690
2003/0095118 A1 * 5/2003 Kato .......................... 345/213
2006/0050037 A1 3/2006 Maki
2006/0267639 A1 * 11/2006 Kobayashi .................. 327/100
2008/0079683 A1 * 4/2008 Hashimoto ................... 345/98

FOREIGN PATENT DOCUMENTS

JP A-2000-347635 12/2000
JP A 2003-157054 5/2003

* cited by examiner

*Primary Examiner*—David L Lewis
*Assistant Examiner*—Benyam Ketema
(74) *Attorney, Agent, or Firm*—Oliff & Berridge, PLC

(57) ABSTRACT

A driver circuit includes an operational amplifier $OPC_1$ which drives a data line by a rail-to-rail operation or a non-rail-to-rail operation based on a grayscale voltage corresponding to one of first to Pth (P is an integer of four or more) grayscale values, and an operational amplifier control section $OPCC_1$ which causes the operational amplifier $OPC_1$ to perform the rail-to-rail operation or the non-rail-to-rail operation based on grayscale data. When the sth ($1 \leqq s \leqq P$, s is an integer) grayscale value corresponding to the grayscale data is in a range of the qth ($1<q<P$, q is an integer) to rth ($q<r<P$, r is an integer) grayscale values, the operational amplifier $OPC_1$ drives the data line by the non-rail-to-rail operation based on the grayscale voltage corresponding to the sth grayscale value, and, when the sth grayscale value is not in the range of the qth to rth grayscale values, the operational amplifier $OPC_1$ drives the data line by the rail-to-rail operation based on the grayscale voltage corresponding to the sth grayscale value.

18 Claims, 21 Drawing Sheets

DATA LINE DRIVER (SOURCE DRIVER)

DATA LINE DRIVER (SOURCE DRIVER)

SCAN LINE DRIVER (GATE DRIVER)

| GRAYSCALE VALUE "16" (qth GRAYSCALE VALUE) | GRAYSCALE VALUE "47" (rth GRAYSCALE VALUE) | POWER SAVE CONTROL |
|---|---|---|
| ≦VTHq | ≧VTHr | ON |
| >VTHq | ≧VTHr | OFF |
| ≦VTHq | <VTHr | OFF |
| >VTHq | <VTHr | OFF |

DRIVER CIRCUIT, ELECTRO-OPTICAL DEVICE, AND ELECTRONIC INSTRUMENT

Japanese Patent Application No. 2005-177639 filed on Jun. 17, 2005, is hereby incorporated by reference in its entirety.

BACKGROUND OF THE INVENTION

The present invention relates to a driver circuit, an electro-optical device, and an electronic instrument.

As a liquid crystal panel (electro-optical device) used for an electronic instrument such as a portable telephone, a simple matrix type liquid crystal panel and an active matrix type liquid crystal panel using a switching device such as a thin film transistor (hereinafter abbreviated as "TFT") are known.

The simple matrix type liquid crystal panel allows power consumption to be easily reduced in comparison with the active matrix type liquid crystal panel. However, the simple matrix type liquid crystal panel has disadvantages in that it is difficult to increase the number of colors and to display a video image. The active matrix type liquid crystal panel is suitable for increasing the number of colors and displaying a video image. However, the active matrix type liquid crystal panel has a disadvantage in that it is difficult to reduce power consumption.

In recent years, a video image display of an increased number of colors has been increasingly demanded for a portable electronic instrument such as a portable telephone in order to provide a high-quality image. Therefore, the active matrix type liquid crystal panel has been increasingly used instead of the simple matrix type liquid crystal panel.

In the active matrix type liquid crystal panel, it is desirable to provide an operational amplifier functioning as an output buffer in a data line driver circuit which drives data lines of the liquid crystal panel.

FIG. 21 shows a configuration of a known operational amplifier.

This operational amplifier is disclosed in JP-A-2003-157054. In this operational amplifier, an n-type driver transistor M10 is controlled by a p-type differential input circuit including p-type transistors M7 and M8, n-type transistors M5 and M6, and a current source CSb. A p-type driver transistor M9 is controlled by an n-type differential input circuit including p-type transistors M1 and M2, n-type transistors M3 and M4, and a current source CSa.

Consider the case where the voltage of an input signal Vin is higher than the voltage of an output signal Vout for the n-type differential input circuit. In this case, since the impedance of the n-type transistor M4 becomes higher than the impedance of the n-type transistor M3, the gate voltage of the p-type transistors M2 and M1 increases, whereby the impedance of the p-type transistor M1 increases. Therefore, the gate voltage of the p-type driver transistor M9 decreases, whereby the p-type driver transistor M9 approaches the ON state.

In the p-type differential input circuit, when the voltage of the input signal Vin is higher than the voltage of the output signal Vout, since the impedance of the p-type transistor M8 becomes smaller than the impedance of the p-type transistor M7, the gate voltage of the n-type transistors M5 and M6 increases, whereby the impedance of the n-type transistor M5 decreases. Therefore, the gate voltage of the n-type driver transistor M10 decreases, whereby the n-type driver transistor M10 approaches the OFF state.

As described above, when the voltage of the input signal Vin is higher than the voltage of the output signal Vout, the p-type driver transistor M9 and the n-type driver transistor M10 operate in such a manner that the voltage of the output signal Vout increases. An operation reverse of the above-described operation is performed when the voltage of the input signal Vin is lower than the voltage of the output signal Vout. As a result of the above-described operation, the operational amplifier transitions to an equilibrium in which the voltage of the input signal Vin is approximately equal to the voltage of the output signal Vout.

However, the input signal Vin is supplied to the p-type transistor M7 as the gate voltage in the p-type differential input circuit, and the input signal Vin is supplied to the n-type transistor M3 as the gate voltage in the n-type differential input circuit. Therefore, as shown in FIG. 22, an input dead zone in which the voltage of the input signal Vin and the voltage of the output signal Vout cannot be made equal occurs in a range R1 in which the input signal Vin is set at a high-potential-side power supply voltage VDD to "VDD−|Vthp|" (Vthp is the threshold voltage of the p-type transistor M7) and in a range R2 in which the input signal Vin is set at a low-potential-side power supply voltage VSS to "VSS+Vthn" (Vthn is the threshold voltage of the n-type transistor M3). This is because the n-type differential input circuit does not operate in the range R2 between the low-potential-side power supply voltage VSS and "VSS+Vthn" since the n-type transistor M3 remains in the OFF state, and the p-type differential input circuit does not operate in the range R1 between the high-potential-side power supply voltage VDD and "VDD−|Vthp|" since the p-type transistor M7 remains in the OFF state.

For example, consider the case of driving a liquid crystal panel at 64 grayscales using a grayscale voltage having a maximum amplitude of 5 V ($Vin_R$). In this case, if the amplitude of 5 V is reduced in order to generate a grayscale voltage corresponding to each grayscale, the grayscale representation is impaired. Therefore, an offset of about 1.9 V is provided taking into consideration the variations of the threshold voltage Vthp of the p-type transistor and the threshold voltage Vthn of the n-type transistor to generate a grayscale voltage having a maximum amplitude of about 6.9 V ($VDD_R$). As a result, when the power supply system of the data line driver circuit is 5 V, it is necessary to provide a voltage booster circuit in order to generate a grayscale voltage having an amplitude of about 6.9 V. When using a charge-pump circuit as the voltage booster circuit, transistors and capacitors for increasing the voltage are additionally required, and a layout taking a high voltage into consideration becomes necessary. Therefore, the chip area, total mounting cost, and power consumption are increased. In particular, since a 5-volt process for a logic power supply is insufficient, it is necessary to use a high-voltage transistor of 7 V or more, whereby the manufacturing cost is increased.

In the operational amplifier having a configuration shown in FIG. 21, the p-type driver transistor M9 and the n-type driver transistor M10 cannot be controlled when the input signal Vin in the input dead zone is input, whereby a shoot-through current cannot be prevented. This causes a decrease in circuit stability and an increase in power consumption.

Moreover, the operational amplifier constantly consumes an operating current. Therefore, even if a circuit configuration which prevents the above-described input dead zone is employed, a reduction in power consumption may not be achieved due to an increase in the number of current paths and the like.

SUMMARY

A first aspect of the invention relates to a driver circuit for driving data lines of an electro-optical device, the driver circuit comprising:

an operational amplifier which drives the data line by a rail-to-rail operation or a non-rail-to-rail operation based on a grayscale voltage corresponding to one of first to Pth (P is an integer of four or more) grayscale values; and an operational amplifier control section which causes the operational amplifier to perform the rail-to-rail operation or the non-rail-to-rail operation based on grayscale data;

when the sth (1≦s≦P, s is an integer) grayscale value corresponding to the grayscale data is in a range of the qth (1<q<P, q is an integer) to rth (q<r<P, r is an integer) grayscale values, the operational amplifier driving the data line by the non-rail-to-rail operation based on the grayscale voltage corresponding to the sth grayscale value; and when the sth grayscale value is not in the range of the qth to rth grayscale values, the operational amplifier driving the data line by the rail-to-rail operation based on the grayscale voltage corresponding to the sth grayscale value.

A second aspect of the invention relates to an electro-optical device comprising:

a plurality of scan lines;

a plurality of data lines;

a plurality of pixels;

a scan line driver circuit which scans the scan lines; and the above driver circuit which drives the data lines.

A third aspect of the invention relates to an electronic instrument comprising the above electro-optical device.

DETAILED DESCRIPTION OF THE EMBODIMENT

Figure 1:
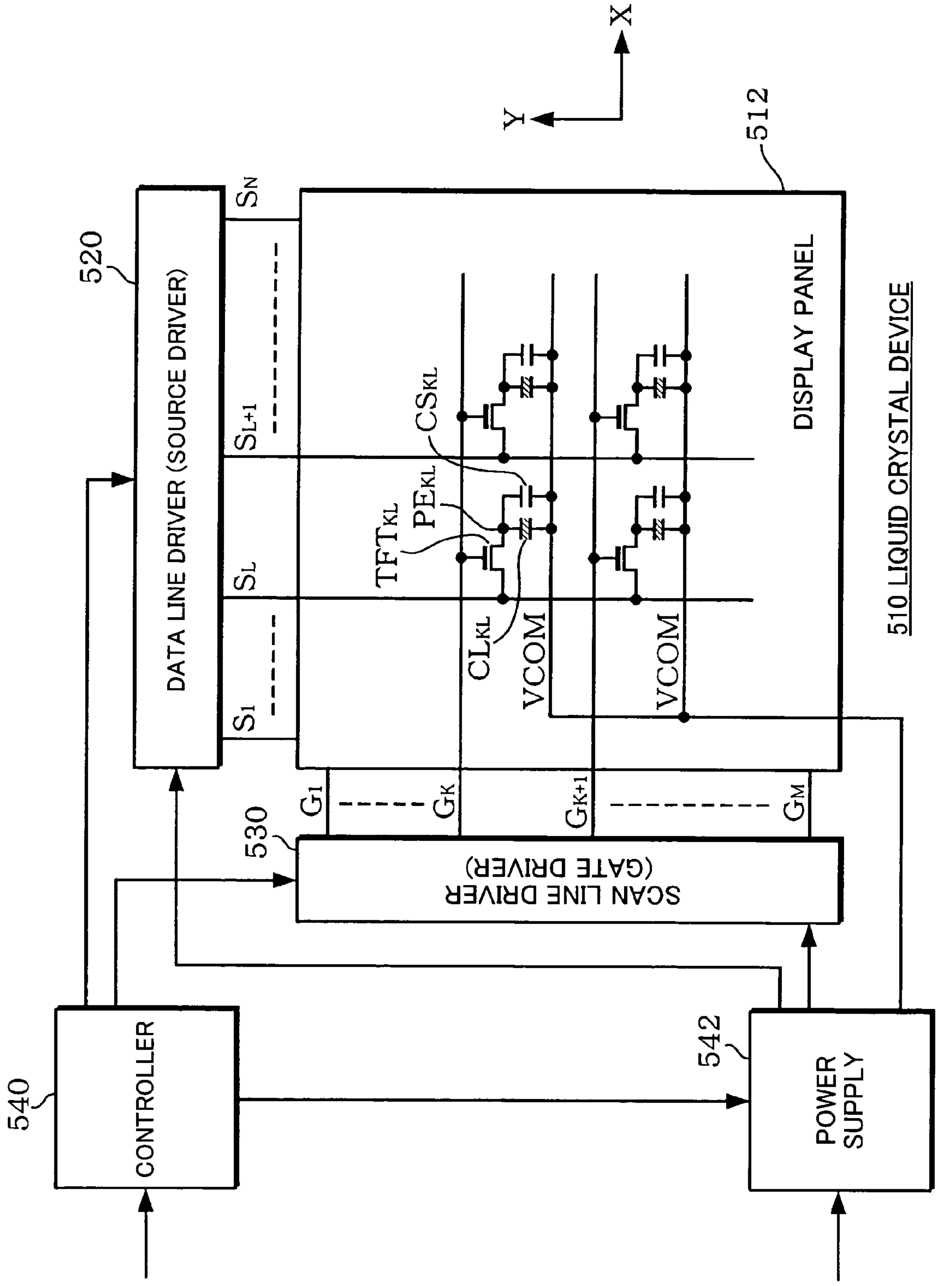
FIG. 1 is a block diagram of a liquid crystal device to which an operational amplifier according to one embodiment of the invention is applied.

The invention may provide a driver circuit exhibiting a high drive capability at a low power consumption, an electro-optical device, and an electronic instrument.

The invention may also provide a driver circuit, an electro-optical device, and an electronic instrument to which an operational amplifier which consumes only a small amount of power and does not have an input dead zone is applied.

One embodiment of the invention relates to a driver circuit for driving data lines of an electro-optical device, the driver circuit comprising:

an operational amplifier which drives the data line by a rail-to-rail operation or a non-rail-to-rail operation based on a grayscale voltage corresponding to one of first to Pth (P is an integer of four or more) grayscale values; and an operational amplifier control section which causes the operational amplifier to perform the rail-to-rail operation or the non-rail-to-rail operation based on grayscale data;

when the sth (1≦s≦P, s is an integer) grayscale value corresponding to the grayscale data is in a range of the qth (1<q<P, q is an integer) to rth (q<r<P, r is an integer) grayscale values, the operational amplifier driving the data line by the non-rail-to-rail operation based on the grayscale voltage corresponding to the sth grayscale value; and when the sth grayscale value is not in the range of the qth to rth grayscale values, the operational amplifier driving the data line by the rail-to-rail operation based on the grayscale voltage corresponding to the sth grayscale value.

According to this embodiment, the operation of the operational amplifier which can be switched between the rail-to-rail operation and the non-rail-to-rail operation is switched to the non-rail-to-rail operation in the medium grayscale value range and switched to the rail-to-rail operation in the large or small grayscale value range. This makes it unnecessary to increase the power supply voltage range of the operational amplifier, whereby power consumption can be reduced. Moreover, since the rail-to-rail operation requires a supplementary current, unnecessary current consumption can be reduced by switching the operation of the operational amplifier to the non-rail-to-rail operation in the medium grayscale value range, whereby power consumption can be further reduced.

In the driver circuit according to this embodiment, the operational amplifier control section may cause the operational amplifier to perform the rail-to-rail operation or the non-rail-to-rail operation for the grayscale value in the range of the qth to rth grayscale values based on higher-order two-bit data of the grayscale data; and when the operation of the operational amplifier has been switched by the operational amplifier control section so that the operational amplifier performs the rail-to-rail operation for the grayscale value in the range of the qth to rth grayscale values, the operational amplifier may drive the data line by the rail-to-rail operation regardless of the grayscale value.

According to this embodiment, the switching between the rail-to-rail operation and the non-rail-to-rail operation of the operational amplifier can be achieved using a simple configuration.

The driver circuit according to this embodiment may comprise:

a comparison section which compares the grayscale voltage corresponding to the qth grayscale value with a first threshold value, and compares the grayscale voltage corresponding to the rth grayscale value with a second threshold value;

wherein the operational amplifier control section may cause the operational amplifier to perform the rail-to-rail operation or the non-rail-to-rail operation for the grayscale value in the range of the qth to rth grayscale values based on a comparison result of the comparison section; and wherein, when the operation of the operational amplifier has been switched by the operational amplifier control section so that the operational amplifier performs the rail-to-rail operation for the grayscale value in the range of the qth to rth grayscale values, the operational amplifier may drive the data line by the rail-to-rail operation regardless of the grayscale value.

In the driver circuit according to this embodiment, the operational amplifier control section may cause the operational amplifier to perform the non-rail-to-rail operation for the grayscale value in the range of the qth to rth grayscale values on condition that the grayscale voltage corresponding to the qth grayscale value is equal to or less than the first threshold value and the grayscale voltage corresponding to the rth grayscale value is equal to or greater than the second threshold value, or the grayscale voltage corresponding to the rth grayscale value is equal to or greater than the first threshold value and the grayscale voltage corresponding to the qth grayscale value is equal to or less than the second threshold value.

The driver circuit according to this embodiment may comprise:

a threshold storage section which stores the first and second threshold values corresponding to a power supply voltage range of the operational amplifier and an output amplitude voltage supplied to the data line;

wherein the comparison section may perform the comparison based on information stored in the threshold storage section.

According to the above embodiment, since whether or not to cause the operational amplifier to perform the non-rail-to-rail operation for the medium grayscale value can be determined corresponding to the grayscale characteristics, deterioration of the image quality, which occurs when driving the data line by the non-rail-to-rail operation at a grayscale value at which the data line should be driven by the rail-to-rail operation, can be prevented.

The driver circuit according to this embodiment may comprise:

an output amplitude voltage setting register for setting the output amplitude voltage; and an offset voltage setting register for setting an offset voltage for the output amplitude voltage;

wherein the comparison section may perform the comparison based on the information stored in the threshold storage section corresponding to the output amplitude voltage set in the output amplitude voltage setting register and an addition result of the output amplitude voltage and the offset voltage set in the offset voltage setting register.

According to this embodiment, the switching between the rail-to-rail operation and the non-rail-to-rail operation of the operational amplifier can be achieved according to optimum grayscale characteristics corresponding to the operating conditions.

In the driver circuit according to this embodiment, the operational amplifier may include:

a first conductivity type differential amplifier circuit (100) which includes a first conductivity type first differential transistor pair (PT1, PT2), sources of the transistors being connected with a first current source (CS1) and an input signal (Vin) and an output signal (Vout) being respectively input to gates of the transistors, and a first current mirror circuit (CM1) which generates drain currents of the transistors of the first differential transistor pair;

a second conductivity type differential amplifier circuit (110) which includes a second conductivity type second differential transistor pair (NT3, NT4), sources of the transistors being connected with a second current source (CS2) and the input signal (Vin) and the output signal (Vout) being respectively input to gates of the transistors, and a second current mirror circuit (CM2) which generates drain currents of the transistors of the second differential transistor pair;

a first auxiliary circuit (130) which drives at least one of a first output node (ND1) and a first inversion output node (NXD1) which are drains of the transistors of the first differential transistor pair based on the input signal (Vin) and the output signal (Vout);

a second auxiliary circuit (140) which drives at least one of a second output node (ND2) and a second inversion output node (NXD2) which are drains of the transistors of the second differential transistor pair based on the input signal (Vin) and the output signal (Vout); and an output circuit (120) which includes a second conductivity type first driver transistor (NTO1) of which gate voltage is controlled based on voltage of the first output node (ND1), and a first conductivity type second driver transistor (PTO1) of which a drain is connected with a drain of the first driver transistor and of which gate voltage is controlled based on voltage of the second output node (ND2) and outputs voltage of the drain of the first driver transistor as the output signal (Vout);

when an absolute value of a gate-source voltage of the transistor (PT1) of the first differential transistor pair (PT1, PT2) to which the input signal (Vin) is input at the gate is smaller than an absolute value of a threshold voltage of the transistor, the first auxiliary circuit (130) may control the gate voltage of the first driver transistor (NTO1) by driving at least one of the first output node (ND1) and the first inversion output node (NXD1);

when an absolute value of a gate-source voltage of the transistor (NT3) of the second differential transistor pair (NT3, NT4) to which the input signal (Vin) is input at the gate is smaller than an absolute value of a threshold voltage of the transistor, the second auxiliary circuit (140) may control the gate voltage of the second driver transistor (PTO1) by driving at least one of the second output node (ND2) and the second inversion output node (NXD2); and the operational amplifier control section may stop or limit an operating current of at least one of the first and second auxiliary circuits, whereby the operational amplifier may perform the non-rail-to-rail operation.

According to this embodiment, the gate voltages of the first and second driver transistors of the output circuit can be controlled, whereby a driver circuit can be provided which includes an operational amplifier which eliminates unnecessary shoot-through current caused when the input signal is in the range of the input dead zone. Therefore, since the operational amplifier can be formed using the voltage between the high-potential-side power supply voltage and the low-potential-side power supply voltage as the amplitude, the operating voltage can be reduced without decreasing the drive capability, whereby power consumption can be further reduced. This means mounting a voltage booster circuit and a reduction in voltage of the manufacturing process, whereby cost is reduced.

Note that another element (e.g. switching device) may be provided between the first differential transistor pair and the first current source, between the second differential transistor pair and the second current source, or between the drains of the first and second driver transistors.

In the driver circuit according to this embodiment, the operational amplifier may include:

a first conductivity type differential amplifier circuit (100) which amplifies a difference between an input signal (Vin) and an output signal (Vout);

a second conductivity type differential amplifier circuit (110) which amplifies the difference between the input signal (Vin) and the output signal (Vout);

a first auxiliary circuit (130) which drives at least one of a first output node (ND1) and a first inversion output node (NXD1) of the first conductivity type differential amplifier circuit (100) based on the input signal (Vin) and the output signal (Vout);

a second auxiliary circuit (140) which drives at least one of a second output node (ND2) and a second inversion output node (NXD2) of the second conductivity type differential amplifier circuit based on the input signal (Vin) and the output signal (Vout); and an output circuit (120) which generates the output signal (Vout) based on voltages of the first and second output nodes (ND1, ND2);

the first conductivity type differential amplifier circuit (100) may include:

a first current source (CS1) to which a first power supply voltage (VDD) is supplied at one end;

a first conductivity type first differential transistor pair (PT1, PT2), sources of the transistors being connected with the other end of the first current source (CS1), drains of the transistors being respectively connected with the first output node (ND1) and the first inversion output node (NXD1), and the input signal (Vin) and the output signal (Vout) being respectively input to gates of the transistors; and a first current mirror circuit (CM1) which includes a second conductivity type first transistor pair (NT1, NT2) of which gates are connected, a second power supply voltage (VSS) being supplied to sources of the transistors of the first transistor pair (NT1, NT2), drains of the transistors being respectively connected with the first output node (ND1) and the first inversion output node (NXD1), and the drain and the gate of the transistor (NT2) of the first transistor pair (NT1, NT2) which is connected with the first inversion output node (NXD1) being connected;

the second conductivity type differential amplifier circuit (110) may include:

a second current source (CS2) to which the second power supply voltage (VSS) is supplied at one end;

a second conductivity type second differential transistor pair (NT3, NT4), sources of the transistors being connected with the other end of the second current source (CS2), drains of the transistors being respectively connected with the second output node (ND2) and the second inversion output node (NXD2), and the input signal (Vin) and the output signal (Vout) being respectively input to gates of the transistors; and a second current mirror circuit (CM2) which includes a first conductivity type second transistor pair (PT3, PT4) of which gates are connected, the first power supply voltage (VDD) being supplied to sources of the transistors of the second transistor pair, drains of the transistors being respectively connected with the second output node (ND2) and the second inversion output node (NXD2), and the drain and the gate of the transistor of the second transistor pair (PT3, PT4) which is connected with the second inversion output node (NXD2) being connected;

the output circuit (120) may include a first conductivity type second driver transistor (PTO1) of which a gate is connected with the second output node (ND2), and a second conductivity type first driver transistor (PTO1) of which a gate is connected with the first output node (ND1) and a drain is connected with a drain of the second driver transistor, and output voltage of the drain of the first driver transistor (NTO1) as the output signal (Vout);

when an absolute value of a gate-source voltage of the transistor (PT1) of the first differential transistor pair (PT1, PT2) to which the input signal (Vin) is input at the gate is smaller than an absolute value of a threshold voltage of the transistor, the first auxiliary circuit (130) may control a gate voltage of the first driver transistor (NTO1) by driving at least one of the first output node (ND1) and the first inversion output node (NXD1);

when an absolute value of a gate-source voltage of the transistor (NT3) of the second differential transistor pair (NT3, NT4) to which the input signal (Vin) is input at the gate is smaller than an absolute value of a threshold voltage of the transistor, the second auxiliary circuit (140) may control a gate voltage of the second driver transistor (PTO1) by driving at least one of the second output node (ND2) and the second inversion output node (NXD2); and the operational amplifier control section may stop or limit an operating current of at least one of the first and second auxiliary circuits, whereby the operational amplifier may perform the non-rail-to-rail operation.

According to this embodiment, the gate voltages of the first and second driver transistors of the output circuit can be controlled, whereby a driver circuit can be provided which includes an operational amplifier which eliminates unnecessary shoot-through current caused when the input signal is in the range of the input dead zone. Therefore, since the operational amplifier can be formed using the voltage between the high-potential-side power supply voltage and the low-potential-side power supply voltage as the amplitude, the operating voltage can be reduced without decreasing the drive capability, whereby power consumption can be further reduced. This means mounting a voltage booster circuit and a reduction in voltage of the manufacturing process, whereby cost is reduced.

Note that another element (e.g. switching device) may be provided between the first differential transistor pair and the first current source, between the drain of each transistor of the first differential transistor pair and the first output node or the first inversion output node, between the second differential transistor pair and the second current source, between the drain of each transistor of the second differential transistor pair and the first inversion output node or the second inversion output node, between the drains of the first and second driver transistors, between the first output node and the gate of the first driver transistor, or between the gate of the first inversion output node and the second driver transistor.

In the driver circuit according to this embodiment, the first auxiliary circuit may include:

first conductivity type first and second current driver transistors (PA1, PA2), the first power supply voltage (VDD) being supplied to sources of the first and second current driver transistors (PA1, PA2) and drains of the first and second current driver transistors being respectively connected with the first output node (ND1) and the first inversion output node (NXD1); and a first current control circuit (132) which controls gate voltages of the first and second current driver transistors (PA1, PA2) based on the input signal (Vin) and the output signal (Vout);

when an absolute value of a gate-source voltage of the transistor (PT1) of the first differential transistor pair (PT1, PT2) to which the input signal (Vin) is input at the gate is smaller than an absolute value of a threshold voltage of the transistor, the first current control circuit (132) may control the gate voltages of the first and second current driver transistors (PA1, PA2) so that at least one of the first output node (ND1) and the first inversion output node (NXD1) is driven; and the operational amplifier control section may stop or limit an operating current of the first current control circuit.

According to this embodiment, the first output node or the first inversion output node can be driven using a simple configuration by controlling the gate voltages of the first and second current driver transistors. As a result, the gate voltage of the first driver transistor can be controlled using a simple configuration.

Note that another element (e.g. switching device) may be provided between the drain of the first or second current driver transistor and the first output node or first inversion output node.

In the driver circuit according to this embodiment, the second auxiliary circuit (140) may include:

second conductivity type third and fourth current driver transistors, the second power supply voltage (VSS) being supplied to sources of the third and fourth current driver transistors (NA3, NA4) and drains of the third and fourth current driver transistors being respectively connected with the second output node (ND2) and the second inversion output node (NXD2); and a second current control circuit (142) which controls gate voltages of the third and fourth current driver transistors (NA3, NA4) based on the input signal (Vin) and the output signal (Vout);

when an absolute value of a gate-source voltage of the transistor (NT3) of the second differential transistor pair (NT3, NT4) to which the input signal (Vin) is input at the gate is smaller than an absolute value of a threshold voltage of the transistor, the second current control circuit (142) may control the gate voltages of the third and fourth current driver transistors (NA3, NA4) so that at least one of the second output node (ND2) and the second inversion output node (NXD2) is driven; and the operational amplifier control section may stop or limit an operating current of the second current control circuit.

According to this embodiment, the first inversion output node or the second inversion output node can be driven using a simple configuration by controlling the gate voltages of the third and fourth current driver transistors. As a result, the gate voltage of the second driver transistor can be controlled using a simple configuration.

Note that another element (e.g. switching device) may be provided between the drain of the third or fourth current driver transistor and the first inversion output node or second inversion output node.

In the driver circuit according to this embodiment, the first current control circuit (132) may include:

a third current source (CS3) to which the second power supply voltage (VSS) is supplied at one end;

a second conductivity type third differential transistor pair (NS5, NS6), sources of the transistors being connected with the other end of the third current source (CS3) and the input signal (Vin) and the output signal (Vout) being respectively input to gates of the transistors; and first conductivity type fifth and sixth current driver transistors (PS5, PS6), the first power supply voltage (VDD) being supplied to sources of the fifth and sixth current driver transistors, drains of the fifth and sixth current driver transistors being respectively connected with the drains of the transistors of the third differential transistor pair (NS5, NS6), and a gate and a drain of each of the fifth and sixth current driver transistors being connected;

the drain of the transistor (NS5) of the third differential transistor pair to which the input signal (Vin) is input at the gate may be connected with the gate of the second current driver transistor (PA2);

the drain of the transistor (NS6) of the third differential transistor pair to which the output signal (Vout) is input at the gate may be connected with the gate of the first current driver transistor (PA1); and the operational amplifier control section may stop or limit current of the third current source.

According to this embodiment, when the input signal in such a range that the first differential transistor pair does not operate is input, the first output node and the first inversion output node can be supplementarily driven by the first and second current driver transistors controlled by the first current control circuit using a simple configuration.

Note that another element (e.g. switching device) may be provided between the source of each transistor of the third differential transistor pair and the third current source, between the drain of each transistor of the third differential transistor pair and the drain of the fifth or sixth current driver transistor, between the drain of the transistor of the third differential transistor pair to which the input signal is input at the gate and the gate of the second current driver transistor, or between the drain of the transistor of the third differential transistor pair to which the output signal is input at the gate and the gate of the first current driver transistor.

In the driver circuit according to this embodiment, the second current control circuit (142) may include:

a fourth current source (CS4) to which the first power supply voltage (VDD) is supplied at one end;

a first conductivity type fourth differential transistor pair (PS7, PS8), sources of the transistors being connected with the other end of the fourth current source (CS4) and the input signal (Vin) and the output signal (Vout) being respectively input to gates of the transistors; and second conductivity type seventh and eighth current driver transistors (NS7, NS8), the second power supply voltage (VSS) being supplied to sources of the seventh and eighth current driver transistors, drains of the seventh and eighth current driver transistors being respectively connected with the drains of the transistors of the fourth differential transistor pair (PS7, PS8), and a gate and a drain of each of the seventh and eighth current driver transistors being connected;

the drain of the transistor (PS7) of the fourth differential transistor pair to which the input signal (Vin) is input at the gate may be connected with the gate of the fourth current driver transistor (NA4);

the drain of the transistor (PS8) of the fourth differential transistor pair to which the output signal (Vout) is input at the gate may be connected with the gate of the third current driver transistor (NA3); and the operational amplifier control section may stop or limit current of the fourth current source.

According to this embodiment, when the input signal in such a range that the second differential transistor pair does not operate is input, the first inversion output node and the second inversion output node can be supplementarily driven by the third and fourth current driver transistors controlled by the second current control circuit using a simple configuration.

Note that another element (e.g. switching device) may be provided between the source of each transistor of the fourth differential transistor pair and the fourth current source, between the drain of each transistor of the fourth differential transistor pair and the drain of the seventh or eighth current driver transistor, between the drain of the transistor of the fourth differential transistor pair to which the input signal is input at the gate and the gate of the seventh current driver transistor, or between the drain of the transistor of the fourth differential transistor pair to which the output signal is input at the gate and the gate of the eighth current driver transistor.

Another embodiment of the invention relates to an electro-optical device comprising:

a plurality of scan lines;

a plurality of data lines;

a plurality of pixels;

a scan line driver circuit which scans the scan lines; and the above driver circuit which drives the data lines.

According to this embodiment, an electro-optical device including a driver circuit exhibiting a high drive capability at a low power consumption can be provided.

According to this embodiment, an electro-optical device can be provided which includes a driver circuit to which an operational amplifier which consumes only a small amount of power and does not have an input dead zone is applied.

A further embodiment of the invention relates to an electronic instrument comprising the above electro-optical device.

The embodiments of the invention are described below in detail with reference to the drawings. Note that the embodiments described below do not in any way limit the scope of the invention laid out in the claims. Note that all elements of the embodiments described below should not necessarily be taken as essential requirements for the invention.

1. Liquid Crystal Device

FIG. 1 shows an example of a block diagram of a liquid crystal device to which an operational amplifier according to one embodiment of the invention is applied.

A liquid crystal device 510 (display device in a broad sense) includes a display panel 512 (liquid crystal display (LCD) panel in a narrow sense), a data line driver circuit 520 (source driver in a narrow sense), a scan line driver circuit 530 (gate driver in a narrow sense), a controller 540, and a power supply circuit 542. The liquid crystal device 510 need not necessarily include all of these circuit blocks. The liquid crystal device 510 may have a configuration in which at least one of these circuit blocks is omitted.

The display panel 512 (electro-optical device in a broad sense) includes a plurality of scan lines (gate lines in a narrow sense), a plurality of data lines (source lines in a narrow sense), and pixel electrodes specified by the scan lines and the data lines. In this case, an active matrix type liquid crystal device may be formed by connecting a thin film transistor (TFT; switching device in a broad sense) with the data line and connecting the pixel electrode with the thin film transistor TFT.

In more detail, the display panel 512 is formed on an active matrix substrate (e.g. glass substrate). A plurality of scan lines $G_1$ to $G_M$ (M is a positive integer of two or more), arranged in a direction Y shown in FIG. 1 and extending in a direction X, and a plurality of data lines $S_1$ to $S_N$ (N is a positive integer of two or more), arranged in the direction X and extending in the direction Y, are disposed on the active matrix substrate. A thin film transistor $TFT_{KL}$ (switching device in a broad sense) is provided at a position corresponding to the intersecting point of the scan line $G_K$ ($1 \leqq K \leqq M$, K is a positive integer) and the data line $S_L$ ($1 \leqq L \leqq N$, L is a positive integer).

A gate electrode of the thin film transistor $TFT_{KL}$ is connected with the scan line $G_K$, a source electrode of the thin film transistor $TFT_{KL}$ is connected with the data line $S_L$, and a drain electrode of the thin film transistor $TFT_{KL}$ is connected with a pixel electrode $PE_{KL}$. A liquid crystal capacitor $CL_{KL}$ (liquid crystal element) and a storage capacitor $CS_{KL}$ are formed between the pixel electrode $PE_{KL}$ and a common electrode VCOM which faces the pixel electrode $PE_{KL}$ through a liquid crystal element (electro-optical substance in a broad sense). A liquid crystal is sealed between the active matrix substrate, on which the thin film transistor $TFT_{KL}$, the pixel electrode $PE_{KL}$, and the like are formed, and a common substrate, on which the common electrode VCOM is formed. The transmissivity of the pixel changes corresponding to the voltage applied between the pixel electrode $PE_{KL}$ and the common electrode VCOM.

A voltage applied to the common electrode VCOM is generated by the power supply circuit 542. The common electrode VCOM may be formed in a stripe pattern corresponding to each scan line instead of forming the common electrode VCOM over the common substrate.

The data line driver circuit 520 drives the data lines $S_1$ to $S_N$ of the display panel 512 based on grayscale data. The scan line driver circuit 530 sequentially scans the scan lines $G_1$ to $G_M$ of the display panel 512.

The controller 540 controls the data line driver circuit 520, the scan line driver circuit 530, and the power supply circuit 542 according to information set by a host such as a central processing unit (CPU) (not shown).

In more detail, the controller 540 sets an operation mode or supplies a vertical synchronization signal or a horizontal synchronization signal generated therein to the data line driver circuit 520 and the scan line driver circuit 530, and controls the polarity reversal timing of the voltage of the common electrode VCOM for the power supply circuit 542, for example.

The power supply circuit 542 generates the voltage (grayscale voltage) necessary for driving the display panel 512 and the voltage of the common electrode VCOM based on a reference voltage supplied from the outside.

In FIG. 1, the liquid crystal device 510 includes the controller 540. Note that the controller 540 may be provided outside the liquid crystal device 510. Or, the host may be included in the liquid crystal device 510 together with the controller 540. At least one or all of the data line driver circuit 520, the scan line driver circuit 530, the controller 540, and the power supply circuit 542 may be formed on the display panel 512. The liquid crystal device 510 or the display panel 512 may be incorporated into various electronic instruments such as a portable telephone, portable information instrument (e.g. PDA), digital camera, projector, portable audio player, mass storage device, video camera, electronic notebook, or global positioning system (GPS).

1.1 Data Line Driver Circuit

Figure 2:
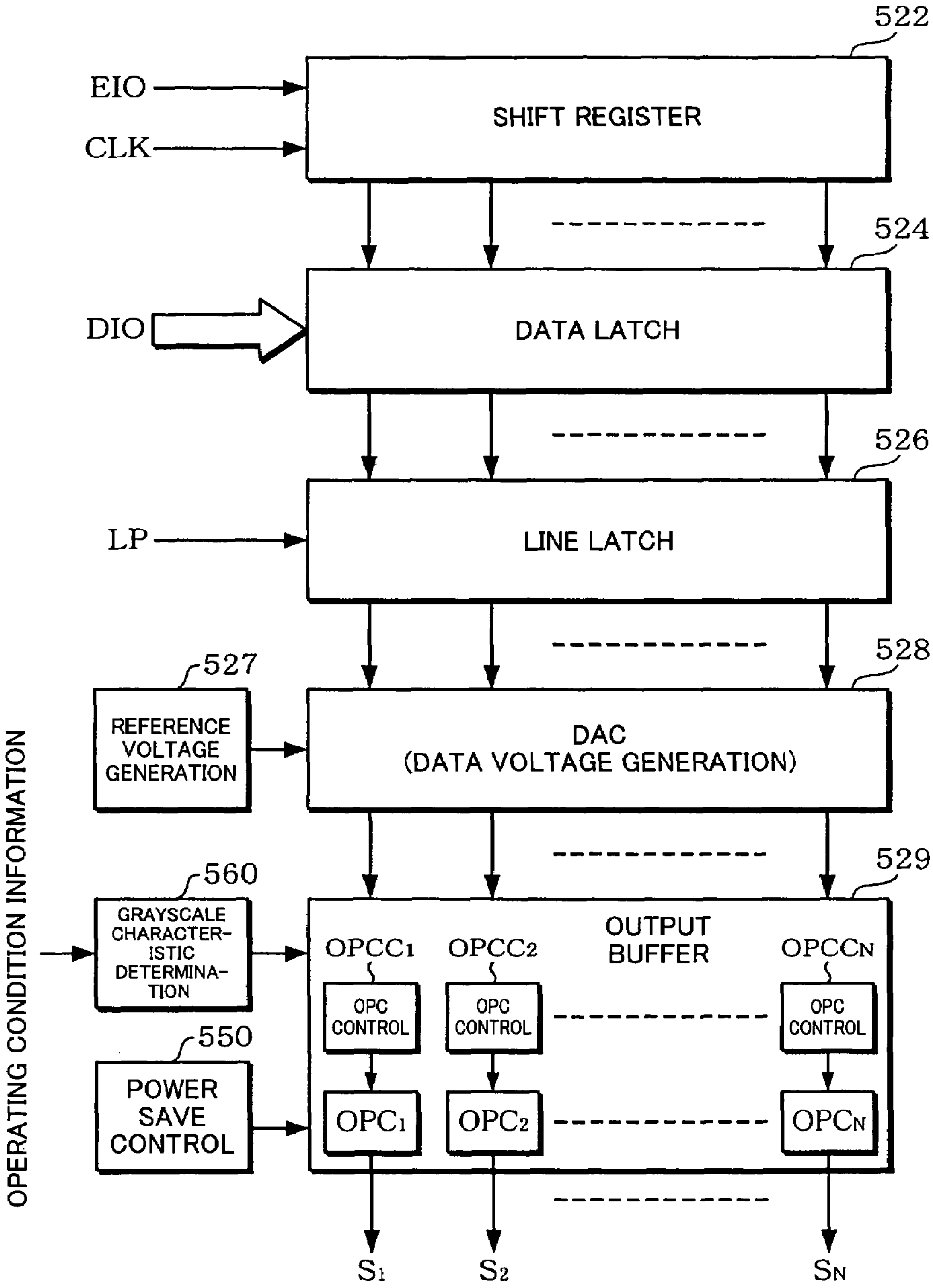
FIG. 2 is a diagram showing a configuration example of a data line driver circuit shown in FIG. 1.

FIG. 2 shows a configuration example of the data line driver circuit 520 shown in FIG. 1.

The data line driver circuit 520 (driver circuit in a broad sense) includes a shift register 522, a data latch 524, a line latch 526, a reference voltage generation circuit 527, a DAC 528 (digital-analog conversion circuit; data voltage generation circuit in a broad sense), and an output buffer 529.

The shift register 522 includes a plurality of flip-flops provided in data line units and sequentially connected. The shift register 522 holds an enable input-output signal EIO in synchronization with a clock signal CLK, and sequentially shifts the enable input-output signal EIO to the adjacent flip-flops in synchronization with the clock signal CLK.

Grayscale data (DIO) is input to the data latch 524 from the controller 540 in units of 18 bits (6 bits (data of each color component)×3 (each color of RGB)), for example. The data latch 524 latches the grayscale data (DIO) in synchronization with the enable input-output signal EIO sequentially shifted by the flip-flops of the shift register 522.

The line latch 526 latches the grayscale data in horizontal scan units latched by the data latch 524 in synchronization with a horizontal synchronization signal LP supplied from the controller 540.

The reference voltage generation circuit 527 generates reference voltages in units of 64 ($=2^6$) grayscales indicated by 6-bit grayscale data. In more detail, the reference voltage generation circuit 527 shown in FIG. 2 selects 64 reference voltages from 256 voltages generated by dividing the voltage between high-potential-side and low-potential-side power supply voltages supplied from the power supply circuit 542, and outputs the selected reference voltages as the grayscale voltages.

The DAC 528 generates an analog data voltage supplied to the data line. In more detail, the DAC 528 selects one of the grayscale voltages from the power supply circuit 542 shown in FIG. 1 based on the digital grayscale data from the line latch 526, and outputs an analog data voltage corresponding to the digital grayscale data.

The output buffer 529 buffers the data voltage from the DAC 528, and drives the data line by outputting the data voltage to the data line. In more detail, the output buffer 529 includes voltage-follower-connected operational amplifiers $OPC_1$ to $OPC_N$ provided in data line units. The operational amplifiers $OPC_1$ to $OPC_N$ perform impedance conversion of the data voltage from the DAC 528, and output the resulting voltage to the data lines.

Each of the operational amplifiers $OPC_1$ to $OPC_N$ drives the data line based on the grayscale data from the DAC 528 by either a rail-to-rail operation or a non-rail-to-rail operation.

The output buffer 529 further includes operational amplifier control sections $OPCC_1$ to $OPCC_N$ provided in units of operational amplifiers. For example, the operational amplifier control section $OPCC_1$ controls switching between the rail-to-rail operation and the non-rail-to-rail operation of the operational amplifier $OPC_1$. Likewise, the operational amplifier control section $OPCC_2$ controls switching between the rail-to-rail operation and the non-rail-to-rail operation of the operational amplifier $OPC_2$, and the operational amplifier control section $OPCC_N$ controls switching between the rail-to-rail operation and the non-rail-to-rail operation of the operational amplifier $OPC_N$.

In FIG. 2, the digital grayscale data is subjected to digital-analog conversion and output to the data line through the output buffer 529. Note that an analog image signal may be sampled, held, and output to the data line through the output buffer 529.

The data line driver circuit 520 may further include a power save control section 550 and a grayscale characteristic determination section 560. The power save control section 550 performs power save control for stopping or limiting the operating current of the operational amplifiers $OPC_1$ to $OPC_N$ of the output buffer 529. The power save control section 550 performs the power save control at a timing at which it is unnecessary to drive the data line.

The grayscale characteristic determination section 560 allows switching from the rail-to-rail operation to the non-rail-to-rail operation of the operational amplifiers $OPC_1$ to $OPC_N$ according to grayscale characteristics corresponding to operating condition information (e.g. power supply voltage and data line output amplitude voltage) indicating the operating conditions of the data line driver circuit 520. The current consumption of the operational amplifiers $OPC_1$ to $OPC_N$ is smaller in the non-rail-to-rail operation than in the rail-to-rail operation. This is because the current consumption during the rail-to-rail operation becomes larger than the current consumption during the non-rail-to-rail operation since a circuit which increases the current drive capability is necessary in order to realize the operation in the input dead zone, as described later.

1.2 Scan Line Driver Circuit

Figure 3:
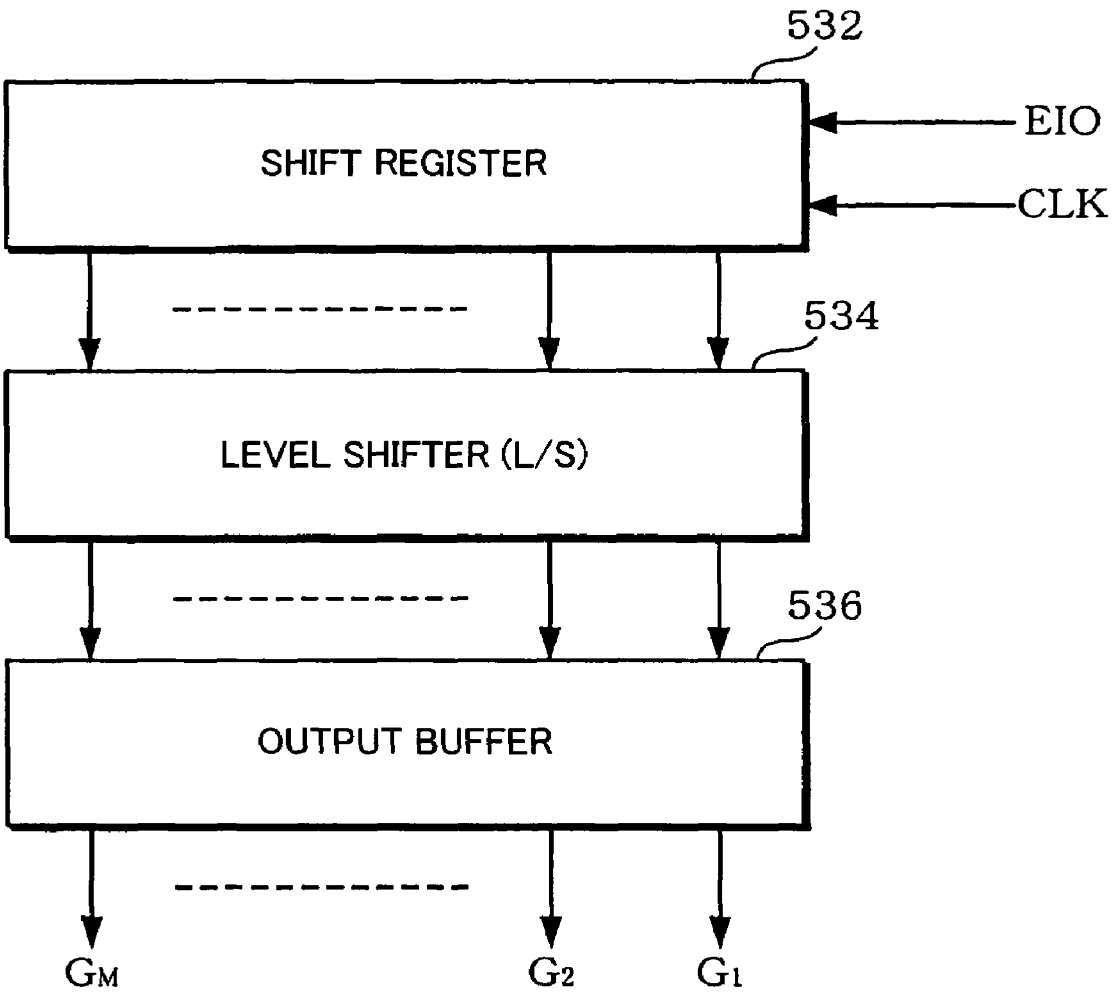
FIG. 3 is a diagram showing a configuration example of a scan line driver circuit shown in FIG. 1.

FIG. 3 shows a configuration example of the scan line driver circuit 530 shown in FIG. 1.

The scan line driver circuit 530 includes a shift register 532, a level shifter 534, and an output buffer 536.

The shift register 532 includes a plurality of flip-flops provided corresponding to the scan lines and sequentially connected. The shift register 532 holds the enable input-output signal EIO in the flip-flop in synchronization with the clock signal CLK, and sequentially shifts the enable input-output signal EIO to the adjacent flip-flops in synchronization with the clock signal CLK. The enable input-output signal EIO input to the shift register 532 is a vertical synchronization signal supplied from the controller 540.

The level shifter 534 shifts the level of the voltage from the shift register 532 to the voltage level corresponding to the liquid crystal element of the display panel 512 and the transistor performance of the thin film transistor TFT. As the voltage level, a high voltage level of 20 to 50 V is necessary, for example.

The output buffer 536 buffers the scan voltage shifted by the level shifter 534, and drives the scan line by outputting the scan voltage to the scan line.

2. Power Save Control of Operational Amplifier

Figure 4:
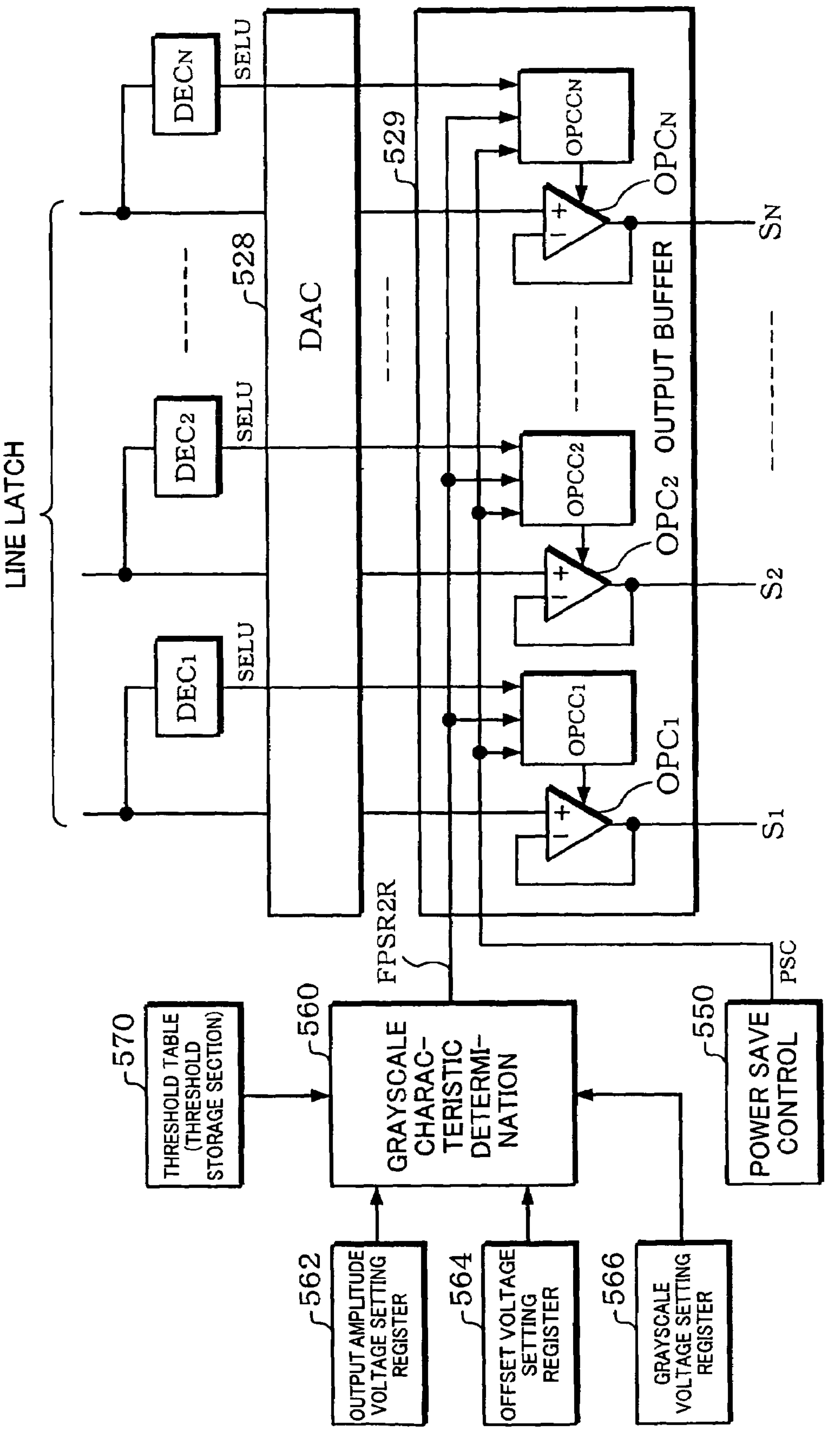
FIG. 4 is a diagram showing an outline of a configuration of the data line driver circuit according to one embodiment of the invention.

FIG. 4 shows the major portion of the configuration of the data line driver circuit 520 shown in FIG. 2.

In FIG. 4, the same sections as shown in FIG. 2 are indicated by the same symbols. Description of these sections is appropriately omitted.

Each of the operational amplifiers $OPC_1$ to $OPC_N$ drives the data line by either the rail-to-rail operation or the non-rail-to-rail operation based on the grayscale voltage corresponding to one of first to Pth (P is an integer of four or more) grayscale values. When the grayscale data of each color component is six bits, P is "64" (64 grayscales). Each of the operational amplifier control sections $OPCC_1$ to $OPCC_N$ causes the operational amplifier to perform the rail-to-rail operation or the non-rail-to-rail operation based on the grayscale data.

When the sth ($1 \leqq s \leqq P$, s is an integer) grayscale value corresponding to the grayscale data is in the range of the qth ($1<q<P$, q is an integer) to rth ($q<r<P$, r is an integer) grayscale values, the operational amplifier drives the data line by the non-rail-to-rail operation based on the grayscale voltage corresponding to the sth grayscale value. When the sth grayscale value is not in the range of the qth to rth grayscale values, the operational amplifier drives the data line by the rail-to-rail operation based on the grayscale voltage corresponding to the sth grayscale value.

The rail-to-rail operation of the operational amplifier is an operation in which the above-described impedance conversion is performed in a state in which the range of the input voltage from the DAC 528 is equal to the range between the high-potential-side power supply voltage and the low-potential-side power supply voltage of the operational amplifier and the input dead zone does not exist in the range of the input voltage. On the other hand, the non-rail-to-rail operation of the operational amplifier is an operation in which the above-described impedance conversion is performed in a state in which the range of the input voltage from the DAC 528 is smaller than the range between the high-potential-side power supply voltage and the low-potential-side power supply voltage of the operational amplifier and the input dead zone exists in the range of the input voltage.

Figure 5:
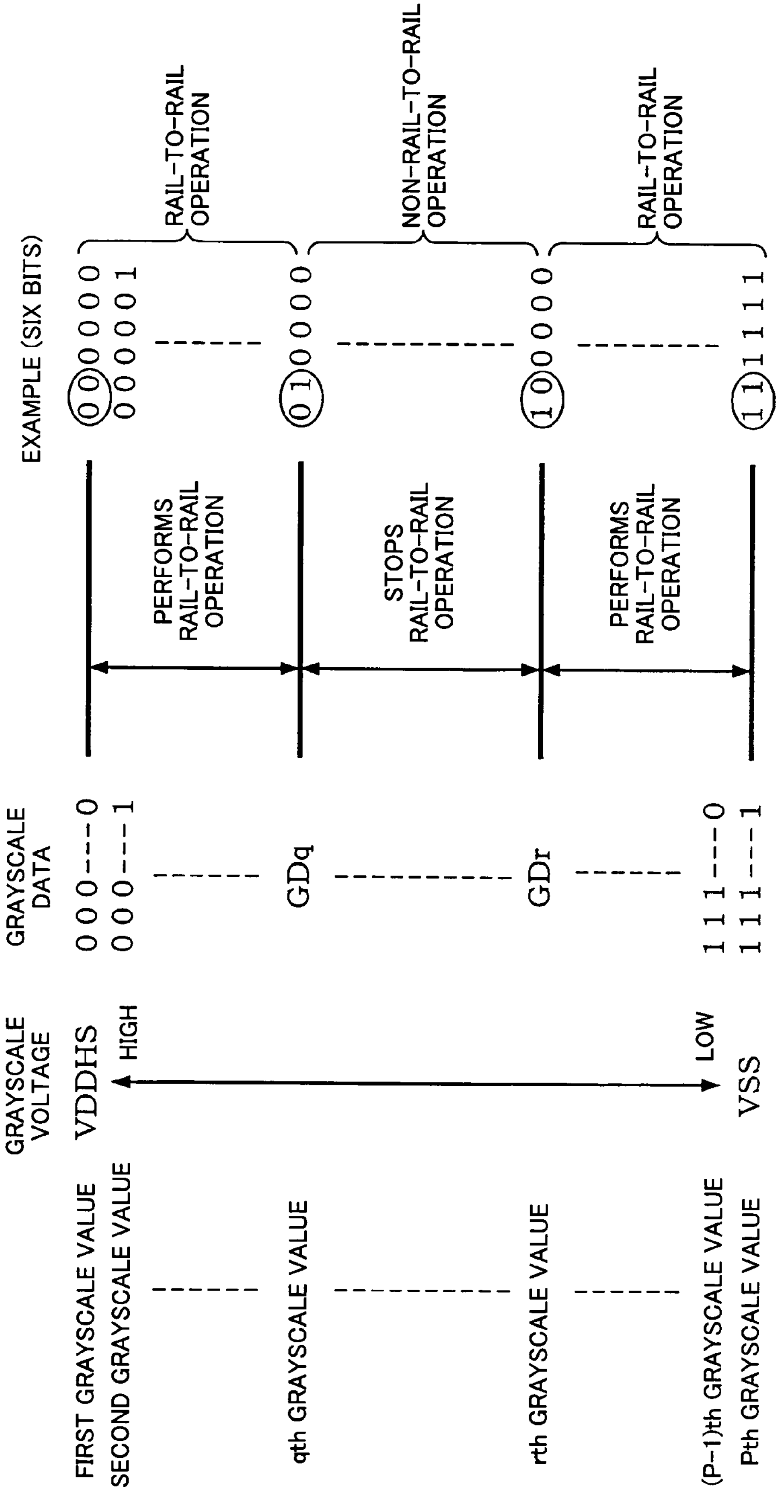
FIG. 5 is a diagram showing the relationship between switch control of a rail-to-rail operation and a non-rail-to-rail operation and a grayscale value.

FIG. 5 shows the relationship between the switch control between the rail-to-rail operation and the non-rail-to-rail operation and the grayscale value.

The grayscale value is specified by the grayscale data. The grayscale voltage is assigned to each of the first to Pth grayscale values which can be specified by the grayscale data. In FIG. 5, the potential of the grayscale voltage assigned to the first grayscale value is the potential on the side of the high-potential-side power supply voltage VDDHS, the potential of the grayscale voltage decreases in the order of the second grayscale value, the third grayscale value, . . . , and the potential of the grayscale voltage assigned to the Pth grayscale value is the potential on the side of the low-potential-side power supply voltage VSS. When the grayscale data is 6 bits, the grayscale voltage corresponding to the first grayscale value of the first to 64th grayscale values may be set at the high-potential-side power supply voltage VDDHS, and the grayscale voltage corresponding to the 64th grayscale value may be set at the low-potential-side power supply voltage VSS, for example.

When the grayscale value corresponding to the grayscale data is in the range of the first to $(q-1)$th grayscale values, the operational amplifier performs impedance conversion by the rail-to-rail operation. When the grayscale value corresponding to the grayscale data is in the range of the qth to rth grayscale values, the operational amplifier performs impedance conversion by the non-rail-to-rail operation. When the grayscale value corresponding to the grayscale data is in the range of the $(r+1)$th to Pth grayscale values, the operational amplifier performs impedance conversion by the rail-to-rail operation.

The switching between the rail-to-rail operation and the non-rail-to-rail operation of the operational amplifier corresponding to the grayscale value may be performed based on the higher-order two-bit data of the six-bit grayscale data. This allows the operation of the operational amplifier to be controlled using a simple configuration. In this case, q is "16" and r is "47". The range of "010000" to "101111" in binary notation ("16" to "47" in decimal notation) can be determined by whether the higher-order two-bit data is "01" or "10".

The relationship between the grayscale value and the grayscale voltage is specified by a curve which indicates grayscale characteristics.

Figure 6:
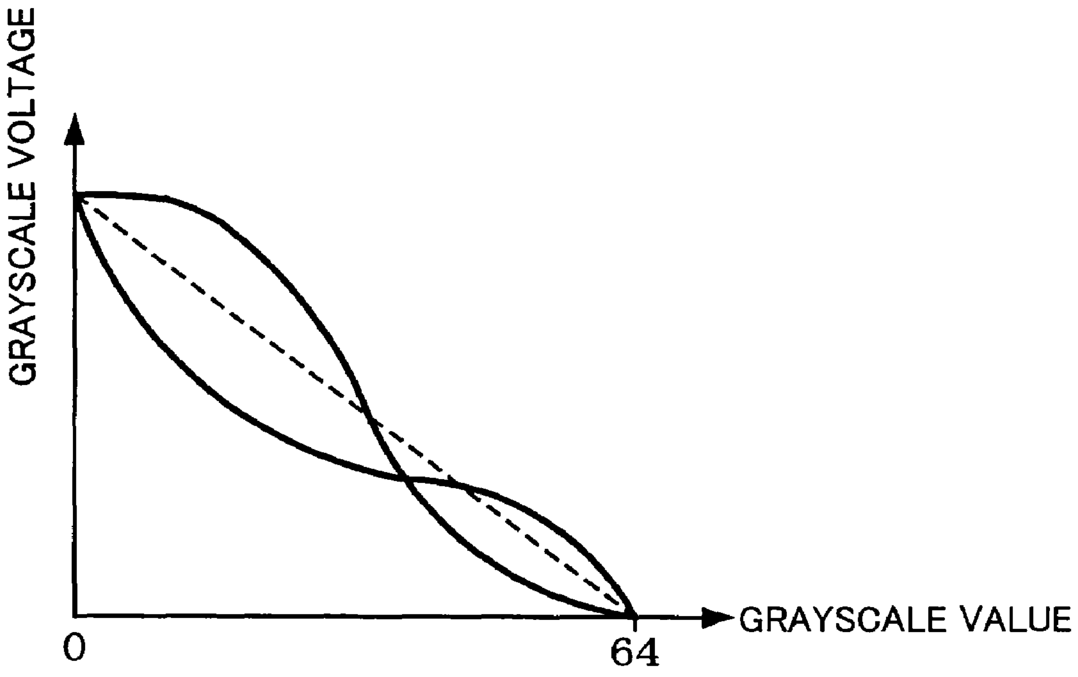
FIG. 6 is a diagram illustrative of grayscale characteristics.

FIG. 6 is a diagram illustrative of the grayscale characteristics.

As shown in FIG. 6, the grayscale characteristics do not exhibit linearity and are specified by a curve which changes depending on the liquid crystal material, the voltage applied to the liquid crystal, manufacturing variations, and the like. Therefore, there may be a case where it suffices to drive the data line by the non-rail-to-rail operation according to one type of grayscale characteristics and it is necessary to drive the data line by the rail-to-rail operation according to another type of grayscale characteristics when using one of the first to Pth grayscale values shown in FIG. 5. A case opposite to the above case may also occur. This also applies to the rth grayscale value.

For example, when the data line is driven by the non-rail-to-rail operation although it is necessary to drive the data line by the rail-to-rail operation, the data line cannot be sufficiently driven at a grayscale voltage in the input dead zone, whereby the image quality deteriorates.

According to this embodiment, the grayscale characteristic determination section 560 permits the switch control between the rail-to-rail operation and the non-rail-to-rail operation of the operational amplifiers $OPC_1$ to $OPC_N$ according to the grayscale characteristics corresponding to the operating condition information indicating the operating conditions of the data line driver circuit 520. In more detail, the grayscale characteristic determination section 560 permits the switch control between the rail-to-rail operation and the non-rail-to-rail operation of the operational amplifiers $OPC_1$ to $OPC_N$ for the grayscale value in the range of the qth to rth grayscale values.

The power save control section 550 shown in FIG. 4 suspends the impedance conversion operations of the operational amplifiers $OPC_1$ to $OPC_N$. Specifically, current which contributes to signal amplification of the operational amplifiers $OPC_1$ to $OPC_N$ is stopped or limited. The grayscale characteristic determination section 560 shown in FIG. 4 permits the switch control between the rail-to-rail operation and the non-rail-to-rail operation of the operational amplifiers $OPC_1$ to $OPC_N$ for the grayscale value in the range of the qth to rth grayscale values corresponding to the grayscale characteristics.

When the switch control has not been permitted, the operational amplifiers $OPC_1$ to $OPC_N$ perform impedance conversion by the rail-to-rail operation regardless of the grayscale value (grayscale voltage corresponding to the grayscale data). When the switch control has been permitted, the operational amplifiers $OPC_1$ to $OPC_N$ perform impedance conversion by the rail-to-rail operation or the non-rail-to-rail operation corresponding to the grayscale value (grayscale voltage corresponding to the grayscale data). Specifically, the operational amplifier performs the non-rail-to-rail operation when the sth grayscale value corresponding to the grayscale data is in the range of the qth to rth grayscale values, and performs the rail-to-rail operation when the sth grayscale value is not in the range of the qth to rth grayscale values. In the non-rail-to-rail operation, unnecessary current which flows during the rail-to-rail operation can be reduced.

As described above, the power save control of the operational amplifiers $OPC_1$ to $OPC_N$ is performed based on the processing result of the grayscale characteristic determination section 560 independently of the power save control of the power save control section 550.

As shown in FIG. 4, the data line driver circuit 520 may further include an output amplitude voltage setting register 562, an offset voltage setting register 564, a grayscale voltage setting register 566, and a threshold table (threshold storage section) 570.

Control information for setting the output (maximum) amplitude voltage supplied to the data line is set in the output amplitude voltage setting register 562. The amplitude voltage of the data line driven by the data line driver circuit 520 is determined based on the control information. For example, the amplitude voltage of the data line is determined by adjusting the voltage from the power supply circuit 542 based on the control information.

Control information for setting an offset voltage for the output amplitude voltage is set in the offset voltage setting register 564. In order to supply the above-mentioned output amplitude voltage to the data line, a voltage higher than the output amplitude voltage in an amount corresponding to the offset voltage is supplied to the operational amplifiers $OPC_1$ to $OPC_N$ as the high-potential-side power supply voltage VDDHS based on the control information. For example, the power supply voltage range of the operational amplifier is determined by adjusting the voltage from the power supply circuit 542 based on the control information.

Control information for setting the grayscale voltage for each of the first to Pth grayscale values is set in the grayscale voltage setting register 566.

Figure 7:
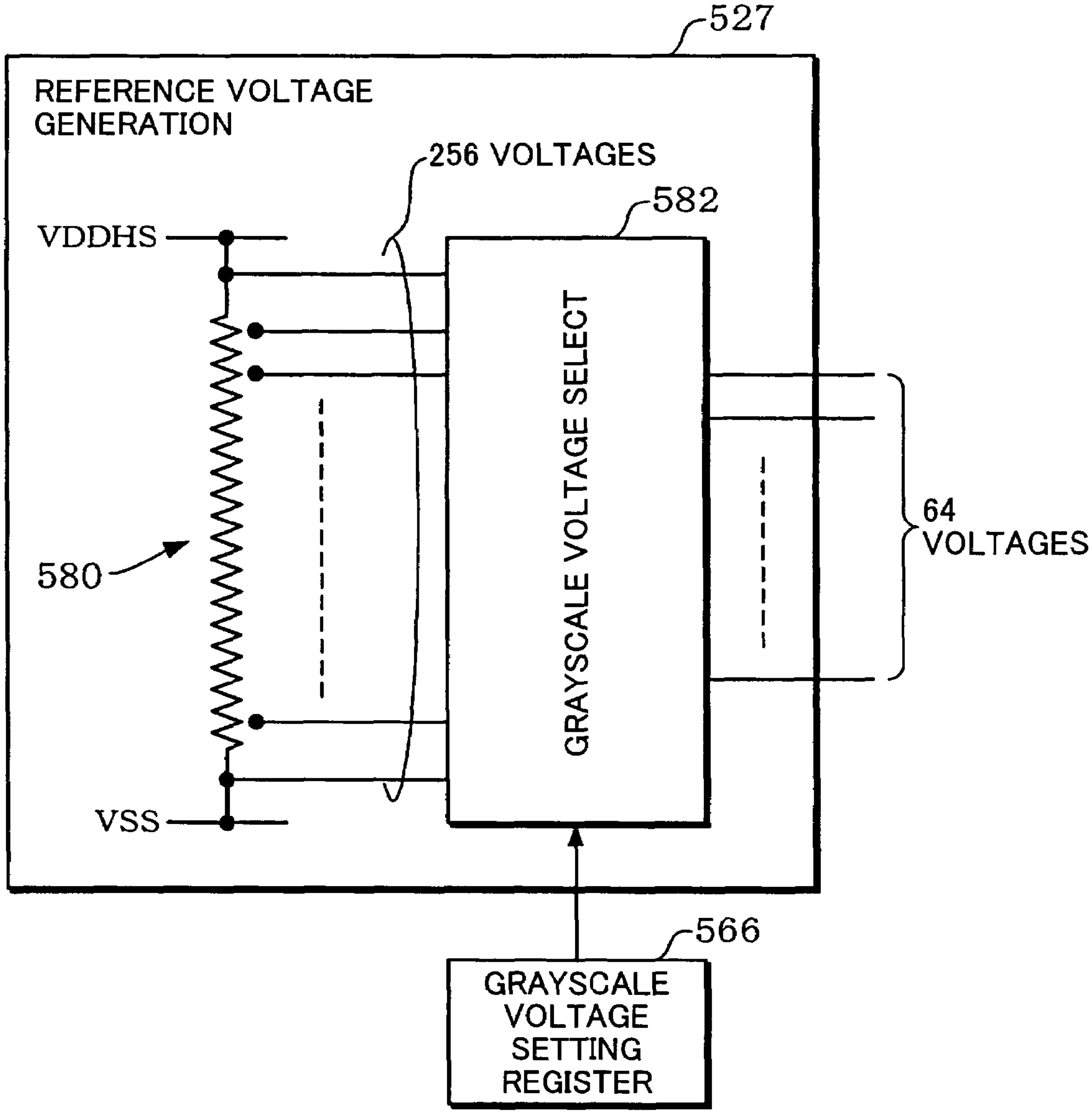
FIG. 7 is a diagram illustrative of control information set in a grayscale voltage setting register.

FIG. 7 is a diagram illustrative of the control information set in the grayscale voltage setting register 566.

FIG. 7 shows the relationship between the reference voltage generation circuit 527 shown in FIG. 2 and the grayscale voltage setting register 566. The reference voltage generation circuit 527 includes a resistor divider circuit 580 and a grayscale voltage select circuit 582. The resistor divider circuit 580 divides the voltage between the high-potential-side power supply voltage VDDHS and the low-potential-side power supply voltage VSS using resistors to generate 256 voltages. The grayscale voltage select circuit 582 selects 64 voltages from the 256 voltages generated by the resistor divider circuit 580 based on the control information set in the grayscale voltage setting register 566, and outputs the selected 64 voltages.

The grayscale voltage corresponding to the grayscale value can be specified by referring to the control information set in the grayscale voltage setting register 566.

The control information is set in the output amplitude voltage setting register 562, the offset voltage setting register 564, and the grayscale voltage setting register 566 by the controller 540 or the host (not shown).

The threshold table 570 shown in FIG. 4 stores a threshold value for the grayscale characteristic determination section 560 to determine whether or not to permit the switch control between the rail-to-rail operation and the non-rail-to-rail operation of the operational amplifiers $OPC_1$ to $OPC_N$ according to the grayscale characteristics corresponding to the operating condition information. In more detail, the threshold table 570 stores first and second threshold values corresponding to the power supply voltage range of the operational amplifiers $OPC_1$ to $OPC_N$ and the output amplitude voltage supplied to the data line. The output (maximum) amplitude voltage supplied to the data line is specified by the output amplitude voltage setting register 562. The power supply voltage range of the operational amplifiers $OPC_1$ to $OPC_N$ is specified by the addition result of the output amplitude voltage specified by the control information set in the output amplitude voltage setting register 562 and the offset voltage specified by the control information set in the offset voltage setting register 564.

Figure 8:
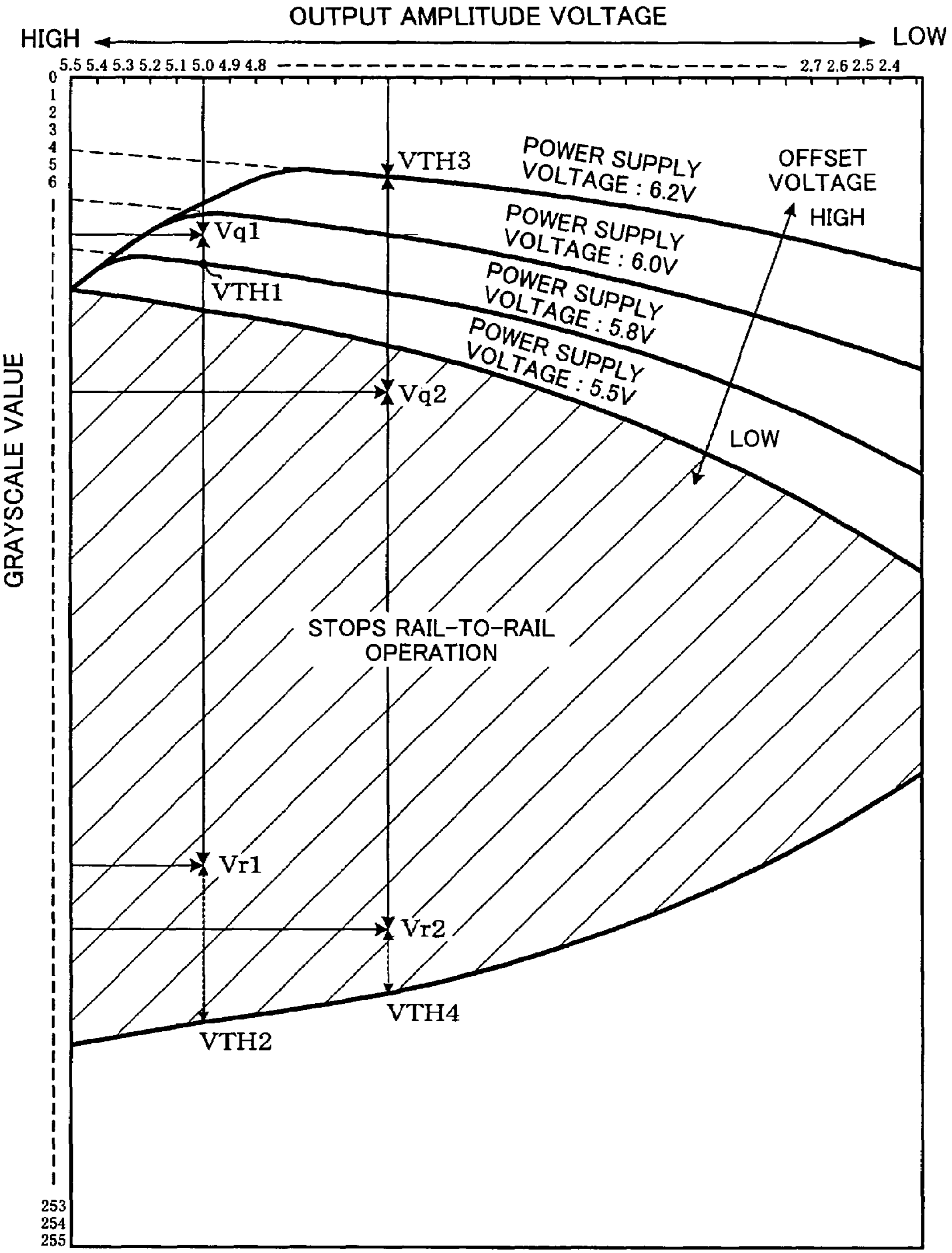
FIG. 8 is a diagram illustrative of a threshold value set in a threshold table.

FIG. 8 is a diagram illustrative of the threshold value set in the threshold table 570.

In FIG. 8, the horizontal axis indicates the output amplitude voltage supplied to the data line. The amplitude voltage decreases from the left to the right. In FIG. 8, the vertical axis indicates the grayscale value. FIG. 8 shows a change in threshold voltage for each output amplitude voltage in the range of the grayscale value 0 to the grayscale value 255 from the top to the bottom.

As the high-potential-side threshold value (first threshold value), a threshold voltage for permitting the switch control between the rail-to-rail operation and the non-rail-to-rail operation is set in the threshold table 570 for each power supply voltage (=output amplitude voltage+offset voltage). In FIG. 8, the threshold voltage of each power supply voltage is stored in the threshold table 570 at intervals of 0.1 V of the output amplitude voltage, for example. The threshold voltage is saturated at a specific voltage at the output amplitude voltage of 4.8 to 5.5 V This means that the area in which the rail-to-rail operation must be performed increases as the power supply voltage approaches the maximum value (5.5 V).

As the low-potential-side threshold value (second threshold value), a threshold voltage for permitting the switch control between the rail-to-rail operation and the non-rail-to-rail operation is also set in the threshold table 570. In FIG. 8, the threshold voltage is stored in the threshold table 570 at intervals of 0.1 V of the output amplitude voltage, for example. Since the potential of the low-potential-side power supply voltage VSS is not decreased, only a change in one threshold voltage is illustrated for the low potential side.

The grayscale characteristic determination section 560 receives the information set in the output amplitude voltage setting register 562, the offset voltage setting register 564, and the grayscale voltage setting register 566 as the operating condition information, and determines whether or not to permit the switch control between the rail-to-rail operation and the non-rail-to-rail operation using the threshold voltage stored in the threshold table 570 corresponding to the operating condition information. Each of the operational amplifier control sections $OPCC_1$ to $OPCC_N$ causes the operational amplifier to perform the non-rail-to-rail operation for the grayscale value in the range of the qth to rth grayscale values on condition that the grayscale voltage corresponding to the qth grayscale value is equal to or less than the first threshold value and the grayscale voltage corresponding to the rth grayscale value is equal to or greater than the second threshold value based on the output from the grayscale characteristic determination section 560.

When the grayscale voltage corresponding to the first grayscale value is lower than the grayscale voltage corresponding to the Pth grayscale value, each of the operational amplifier control sections $OPCC_1$ to $OPCC_N$ causes the operational amplifier to perform the non-rail-to-rail operation for the grayscale value in the range of the qth to rth grayscale values on condition that the grayscale voltage corresponding to the rth grayscale value is equal to or less than the first threshold value and the grayscale voltage corresponding to the qth grayscale value is equal to or greater than the second threshold value.

Figure 9:
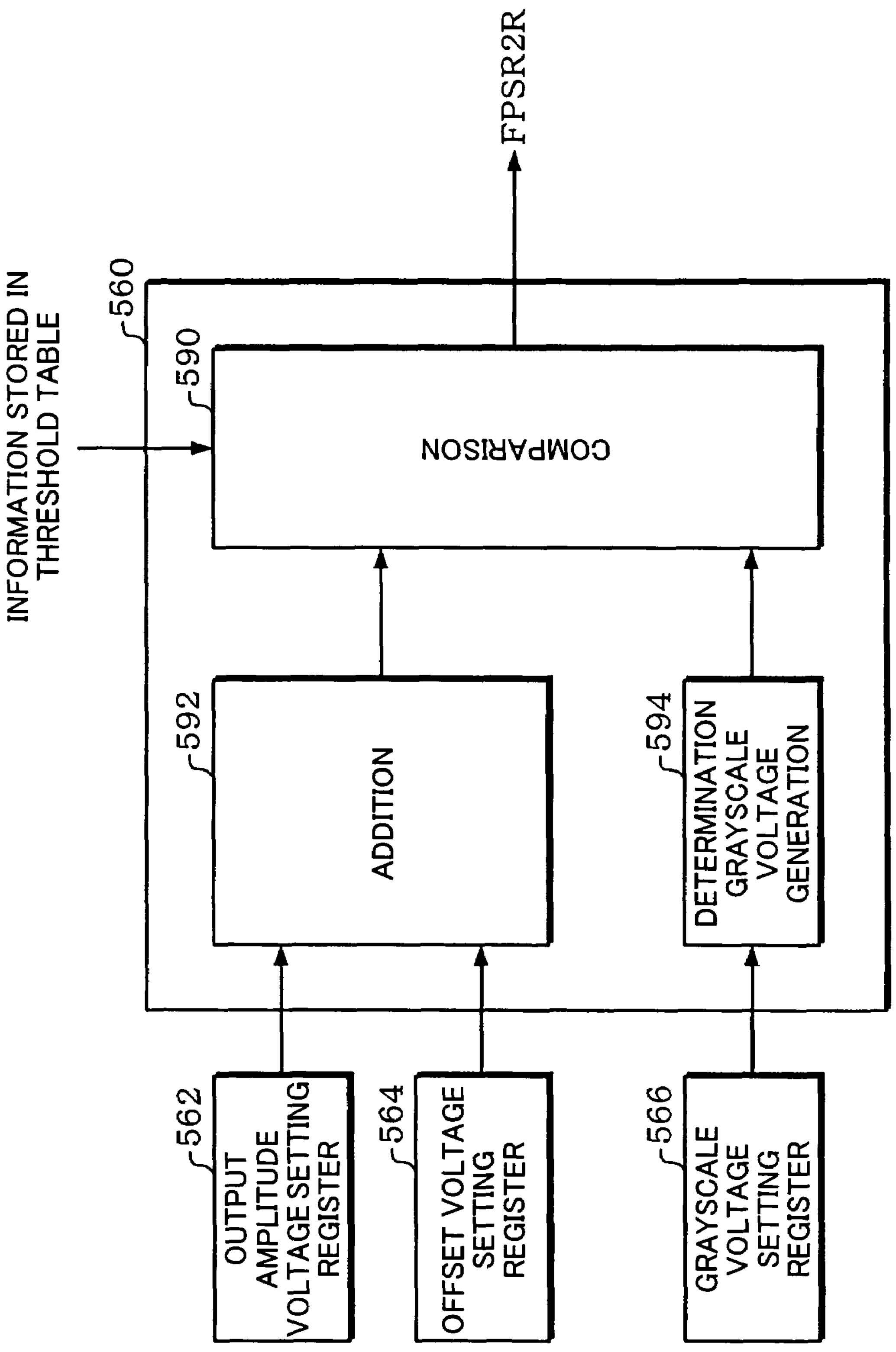
FIG. 9 is a block diagram of a configuration example of a grayscale characteristic determination section shown in FIG. 4.

FIG. 9 is a block diagram of a configuration example of the grayscale characteristic determination section 560 shown in FIG. 4.

In FIG. 9, the same sections as shown in FIG. 4 are indicated by the same symbols. Description of these sections is appropriately omitted.

The grayscale characteristic determination section 560 includes a comparison section 590, an addition section 592, and a determination grayscale voltage generation section 594.

The addition section 592 adds the output amplitude voltage specified by the control information set in the output amplitude voltage setting register 562 and the offset voltage specified by the control information set in the offset voltage setting register 564. The determination grayscale voltage generation section 594 generates the grayscale voltages corresponding to the qth and rth grayscale values based on the control information set in the grayscale voltage setting register 566.

The comparison section 590 compares the grayscale voltage corresponding to the qth grayscale value with the first threshold value, and compares the grayscale voltage corresponding to the rth grayscale value with the second threshold value. In more detail, the comparison section 590 performs the above comparison based on the information stored in the threshold table 570. In more detail, the comparison section 590 performs the above comparison based on the information stored in the threshold table 570 corresponding to the output amplitude voltage set in the output amplitude voltage setting register 562 and the addition result of the output amplitude voltage and the offset voltage set in the offset voltage setting register 564.

Each of the operational amplifier control sections $OPCC_1$ to $OPCC_N$ switches the rail-to-rail operation and the non-rail-to-rail operation of each of the operational amplifiers $OPC_1$ to $OPC_N$ for the grayscale value in the range of the qth to rth grayscale values based on the comparison result of the comparison section 590. When the operation of the operational amplifier has been switched by the operational amplifier control section so that the operational amplifier performs the rail-to-rail operation for the grayscale value in the range of the qth to rth grayscale values, the operational amplifier drives the data line by the rail-to-rail operation regardless of the grayscale value.

Figures 10, 11:
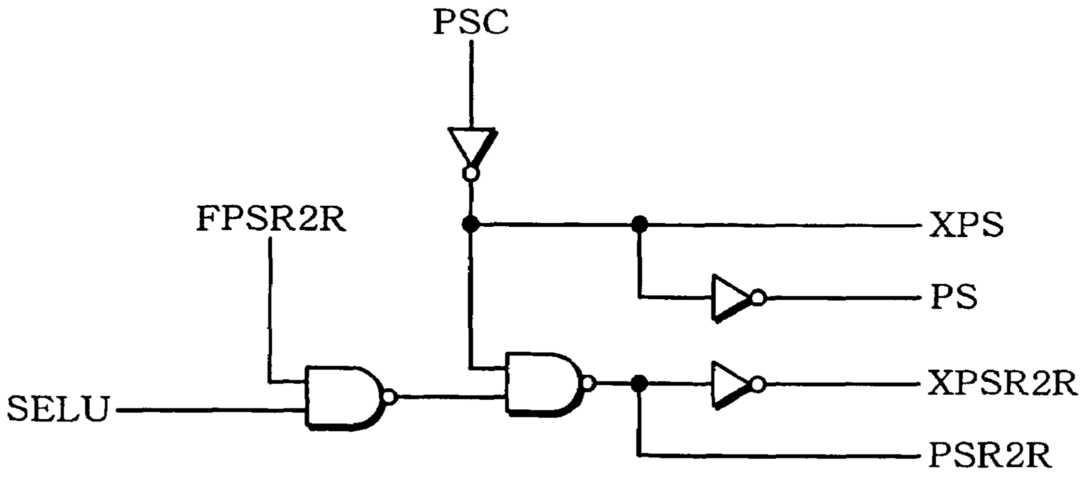
FIG. 10 is a diagram illustrative of the operation of a comparison section.
FIG. 11 is a circuit diagram of a configuration example of an operational amplifier control section.

FIG. 10 is a diagram illustrative of the operation of the comparison section 590.

The comparison section 590 compares the grayscale voltage corresponding to the qth grayscale value with a threshold voltage VTHq which is the first threshold value from the threshold table 570, and compares the grayscale voltage corresponding to the rth grayscale value with a threshold voltage VTHr which is the second threshold value from the threshold table 570. When the grayscale voltage corresponding to the qth grayscale value is equal to or less than the threshold voltage VTHq and the grayscale voltage corresponding to the rth grayscale value is equal to or greater than the threshold voltage VTHr, the comparison section 590 permits switching to the non-rail-to-rail operation for the qth to rth grayscale values, sets a power save direction signal FPSR2R at the H level, and outputs the power save direction signal FPSR2R. Otherwise the comparison section 590 sets the power save direction signal FPSR2R at the L level and outputs the power save direction signal FPSR2R in order to cause the operational amplifier to perform the rail-to-rail operation for the qth to rth grayscale values.

In FIG. 8, when the output amplitude voltage is 5.0 V and the power supply voltage is 5.8 V, a grayscale voltage Vq1 corresponding to the qth grayscale value is higher than the threshold voltage VTH1, and a grayscale voltage Vr1 corresponding to the rth grayscale value is higher than the threshold voltage VTH2. In this case, the operational amplifiers $OPC_1$ to $OPC_N$ drive the data lines by the rail-to-rail operation for the qth to rth grayscale values.

When the output amplitude voltage and the power supply voltage are under other conditions, a grayscale voltage Vq2 corresponding to the qth grayscale value is lower than a threshold voltage VTH3, and a grayscale voltage Vr2 corresponding to the rth grayscale value is higher than a threshold voltage VTH4. In this case, the operational amplifiers $OPC_1$ to $OPC_N$ drive the data lines by the non-rail-to-rail operation for the qth to rth grayscale values.

In either case, the operational amplifiers $OPC_1$ to $OPC_N$ drive the data lines by the rail-to-rail operation for the first to (q−1)th grayscale values and the (r+1)th to Pth grayscale values.

In FIG. 4, the grayscale characteristic determination section 560 may refer to the threshold table 570 formed by a ROM, or the threshold table 570 and the grayscale characteristic determination section 560 formed by a combinational circuit (decoder).

In this embodiment, the switch control between the rail-to-rail operation and the non-rail-to-rail operation is performed for the qth to rth grayscale value by determining the threshold voltages for the q and the rth grayscale values. Note that this embodiment is not limited thereto. The qth to rth grayscale values may be further divided, and whether or not to permit the switch control between the rail-to-rail operation and the non-rail-to-rail operation may be determined in each range.

2.1 Configuration Example 2.1.1 Operational Amplifier Control Section

FIG. 11 is a circuit diagram of a configuration example of the operational amplifier control section $OPCC_1$.

Although FIG. 11 shows a configuration example of the operational amplifier control section $OPCC_1$, the operational amplifier control sections $OPCC_2$ to $OPCC_N$ are configured in the same manner as the operational amplifier control section $OPCC_1$.

A decode result signal SELU is input to the operational amplifier control section $OPCC_1$ from a decoder $DEC_1$ of decoders $DEC_1$ to $DEC_N$ provided in the preceding stage of the DAC 528 as shown in FIG. 4. The decoder decodes the higher-order two-bit data of the six-bit grayscale data from the line latch 526, and outputs the decode result signal SELU which is set at the H level when the data is "01" or "10". When the grayscale data is six bits, the grayscale values "16" to "47" ("010000" to "101111" in binary notation) can be distinguished from the 64 grayscales by the decode result signal SELU.

A power save transition direction signal PSC for the operational amplifiers $OPC_1$ to $OPC_N$ is input to the operational amplifier control section $OPCC_1$ from the power save control section 550. The power save transition direction signal PSC is set at the H level when directing transition of the operational amplifiers $OPC_1$ to $OPC_N$ to a power save mode.

The power save direction signal FPSR2R is input to the operational amplifier control section OPCC1 from the grayscale characteristic determination section 560 as shown in FIG. 10.

The operational amplifier control section $OPCC_1$ masks the decode result signal SELU using the power save direction signal FPSR2R. The mask result signal and the power save transition direction signal PSC are subjected to a logic operation, and output to operational amplifier $OPC_1$ as power save signals PS and PSR2R and inversion power save signals XPS and XPSR2R. The operating current of the operational amplifier $OPC_1$ is stopped or limited by the power save signal PS and the inversion power save signal XPS. The operating current of the operational amplifier $OPC_1$ necessary for the rail-to-rail operation is stopped or limited by the power save signal PSR2R and the inversion power save signal XPSR2R.

For example, when the power save direction signal FPSR2R is set at the L level, the decode result signal SELU is masked in order to cause the operational amplifier $OPC_1$ to perform the rail-to-rail operation regardless of the grayscale value, and the operational amplifier $OPC_1$ performs the rail-to-rail operation based on the power save signals PS and PSR2R and the inversion power save signals XPS and XPSR2R.

When the power save direction signal FPSR2R is set at the H level and the decode result signal SELU is set at the H level, the operational amplifier $OPC_1$ performs the non-rail-to-rail operation based on the power save signal PSR2R and the inversion power save signal XPSR2R, for example. When the power save direction signal FPSR2R is set at the H level and the decode result signal SELU is set at the L level, the operational amplifier $OPC_1$ performs the rail-to-rail operation based on the power save signals PS and PSR2R and the inversion power save signals XPS and XPSR2R, for example.

2.1.2 Operational Amplifier

A configuration example of the operational amplifier which performs the rail-to-rail operation or the non-rail-to-rail operation is described below. In the following description, the high-potential-side power supply voltage VDDHS is indicated as the power supply voltage VDD for convenience.

Figure 12:
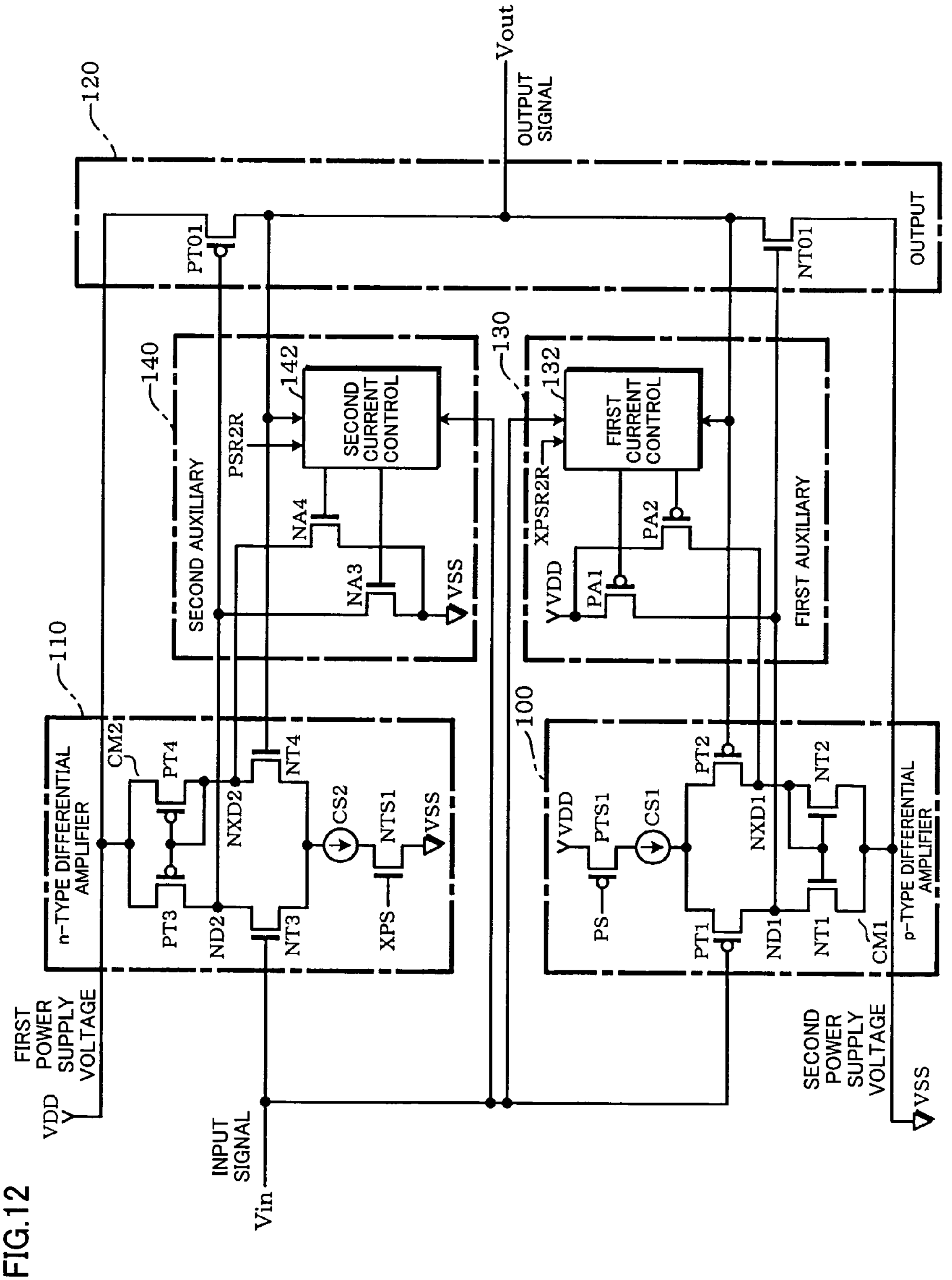
FIG. 12 is a diagram showing a configuration example of an operational amplifier according to one embodiment of the invention.

FIG. 12 shows a configuration example of the operational amplifier $OPC_1$ according to this embodiment.

Although FIG. 12 shows a configuration example of the operational amplifier $OPC_1$, the operational amplifiers $OPC_2$ to $OPC_N$ are configured in the same manner as the operational amplifier $OPC_1$.

The operational amplifier includes a p-type (e.g. first conductivity type) differential amplifier circuit 100, an n-type (e.g. second conductivity type) differential amplifier circuit 110, and an output circuit 120. The p-type differential amplifier circuit 100, the n-type differential amplifier circuit 110, and the output circuit 120 have an operating voltage between the high-potential-side power supply voltage VDD (first power supply voltage in a broad sense) and the low-potential-side power supply voltage VSS (second power supply voltage in a broad sense).

The p-type differential amplifier circuit 100 amplifies the difference between the input signal Vin and the output signal Vout. The p-type differential amplifier circuit 100 includes an output node ND1 (first output node) and an inversion output node NXD1 (first inversion output node), and outputs the voltage corresponding to the difference between the input signal Vin and the output signal Vout between the output node ND1 and the inversion output node NXD1.

The p-type differential amplifier circuit 100 includes a first current mirror circuit CM1 and a p-type (first conductivity type) first differential transistor pair. The first differential transistor pair includes p-type metal-oxide-semiconductor (MOS) transistors (MOS transistor is hereinafter called "transistor") PT1 and PT2. The sources of the p-type transistors PT1 and PT2 are connected with a first current source CS1, and the input signal Vin and the output signal Vout are respectively input to the gates of the p-type transistors PT1 and PT2. The drain current of the p-type transistors PT1 and PT2 is generated by the first current mirror circuit CM1. The input signal Vin is input to the gate of the p-type transistor PT1. The output signal Vout is input to the gate of the p-type transistor PT2. The drain of the p-type transistor PT1 is the output node ND1 (first output node). The drain of the p-type transistor PT2 is the inversion output node NXD1 (first inversion output node).

The n-type differential amplifier circuit 110 amplifies the difference between the input signal Vin and the output signal Vout. The n-type differential amplifier circuit 110 includes an output node ND2 (second output node) and an inversion output node NXD2 (second inversion output node), and outputs the voltage corresponding to the difference between the input signal Vin and the output signal Vout between the output node ND2 and the inversion output node NXD2.

The n-type differential amplifier circuit 110 includes a second current mirror circuit CM2 and an n-type (second conductivity type) second differential transistor pair. The second differential transistor pair includes n-type transistors NT3 and NT4. The sources of the n-type transistors NT3 and NT4 are connected with a second current source CS2, and the input signal Vin and the output signal Vout are respectively input to the gates of the n-type transistors NT3 and NT4. The drain current of the n-type transistors NT3 and NT4 is generated by the second current mirror circuit CM2. The input signal Vin is input to the gate of the n-type transistor NT3. The output signal Vout is input to the gate of the n-type transistor NT4. The drain of the n-type transistor NT3 is the output node ND2 (second output node). The drain of the n-type transistor NT4 is the inversion output node NXD2 (second inversion output node).

The output circuit 120 generates the output signal Vout based on the voltage of the output node ND1 (first output node) of the p-type differential amplifier circuit 100 and the voltage of the output node ND2 (second output node) of the n-type differential amplifier circuit 110.

The output circuit 120 includes an n-type (second conductivity type) first driver transistor NTO1 and a p-type (first conductivity type) second driver transistor PTO1. The gate (voltage) of the first driver transistor NTO1 is controlled based on the voltage of the output node ND1 (first output node) of the p-type differential amplifier circuit 100. The gate (voltage) of the second driver transistor PTO1 is controlled based on the voltage of the output node ND2 (second output node) of the n-type differential amplifier circuit 110. The drain of the second driver transistor PTO1 is connected with the drain of the first driver transistor NTO1. The output circuit 120 outputs the voltage of the drain of the first driver transistor NTO1 (voltage of the drain of the second driver transistor PTO1) as the output signal Vout.

In the operational amplifier according to this embodiment, the input dead zone is eliminated and a shoot-through current is reduced by providing first and second auxiliary circuits 130 and 140. As a result, power consumption is reduced by reducing the shoot-through current without unnecessarily increasing the range of the operating voltage.

The first auxiliary circuit 130 drives at least one of the output node ND1 (first output node) and the inversion output node NXD1 (first inversion output node) of the p-type differential amplifier circuit 100 based on the input signal Vin and the output signal Vout. The second auxiliary circuit 140 drives at least one of the output node ND2 (second output node) and the second inversion output node NXD2 of the n-type differential amplifier circuit 110 based on the input signal Vin and the output signal Vout.

When the absolute value of the gate-source voltage (voltage between gate and source) of the p-type transistor PT1 (transistor of the first differential transistor pair to which the input signal Vin is input at the gate) is smaller than the absolute value of the threshold voltage of the p-type transistor PT1, the first auxiliary circuit 130 controls the gate voltage of the first driver transistor NTO1 by driving at least one of the output node ND1 (first output node) and the inversion output node NXD1 (first inversion output node).

When the absolute value of the gate-source voltage of the n-type transistor NT3 (transistor of the second differential transistor pair to which the input signal Vin is input at the gate) is smaller than the absolute value of the threshold voltage of the n-type transistor NT3, the second auxiliary circuit 140 controls the gate voltage of the second driver transistor PTO1 by driving at least one of the output node ND2 (second output node) and the inversion output node NXD2 (second inversion output node).

Figure 13:
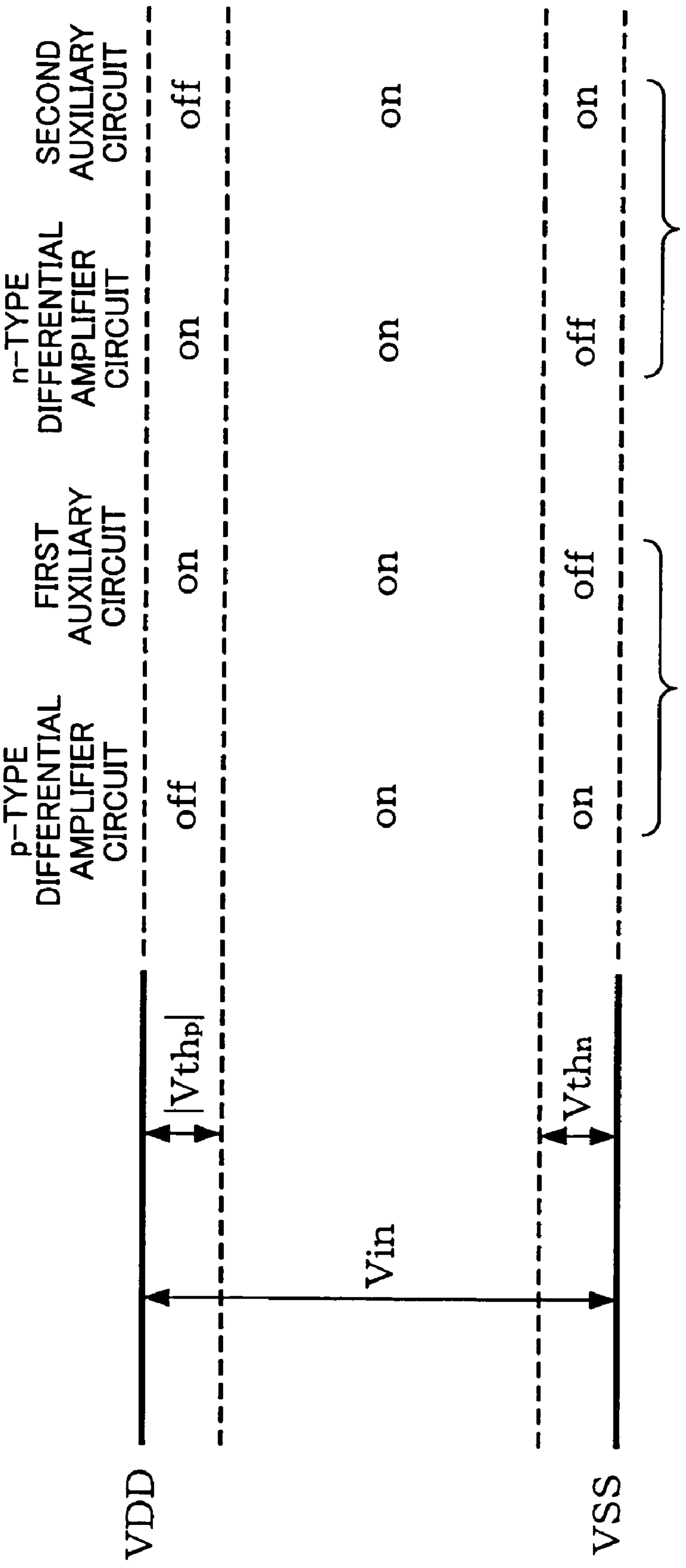
FIG. 13 is a diagram illustrative of the operation of the operational amplifier shown in FIG. 12.

FIG. 13 is a diagram illustrative of the operation of the operational amplifier shown in FIG. 12.

The high-potential-side power supply voltage is indicated by VDD, the low-potential-side power supply voltage is indicated by VSS, the voltage of the input signal is indicated by Vin, the threshold voltage of the p-type transistor PT1 is indicated by Vthp, and the threshold voltage of the n-type transistor NT3 is indicated by Vthn.

When "VDD≧Vin>VDD−|Vthp|", the p-type transistor is turned OFF, and the n-type transistor is turned ON. When the p-type transistor operates in the cutoff region, the linear region, or the saturation region corresponding to the gate voltage, the statement "the p-type transistor is turned OFF" means that the p-type transistor is in the cutoff region. Likewise, when the n-type transistor operates in the cutoff region, the linear region, or the saturation region corresponding to the gate voltage, the statement "the n-type transistor is turned ON" means that the n-type transistor is in the linear region or the saturation region. Therefore, when "VDD≧Vin>VDD−|Vthp|", the p-type differential amplifier circuit 100 does not operate (OFF), and the n-type differential amplifier circuit 110 operates (ON). Therefore, the first auxiliary circuit 130 is operated (ON) (caused to drive at least one of the output node ND1 (first output node) and the inversion output node NXD1 (first inversion output node)), and the second auxiliary circuit 140 is not operated (OFF) (is not caused to drive the output node ND2 (second output node) and the inversion output node NXD1 (second inversion output node)). The voltage of the output node ND1 does not become variable, even if the input signal Vin is in the range of the input dead zone of the first differential transistor pair of the p-type differential amplifier circuit 100, by causing the first auxiliary circuit 130 to drive the output node ND1 (inversion output node NXD1) of the p-type differential amplifier circuit 100 in the range in which the p-type differential amplifier circuit 100 does not operate.

Figure 21:
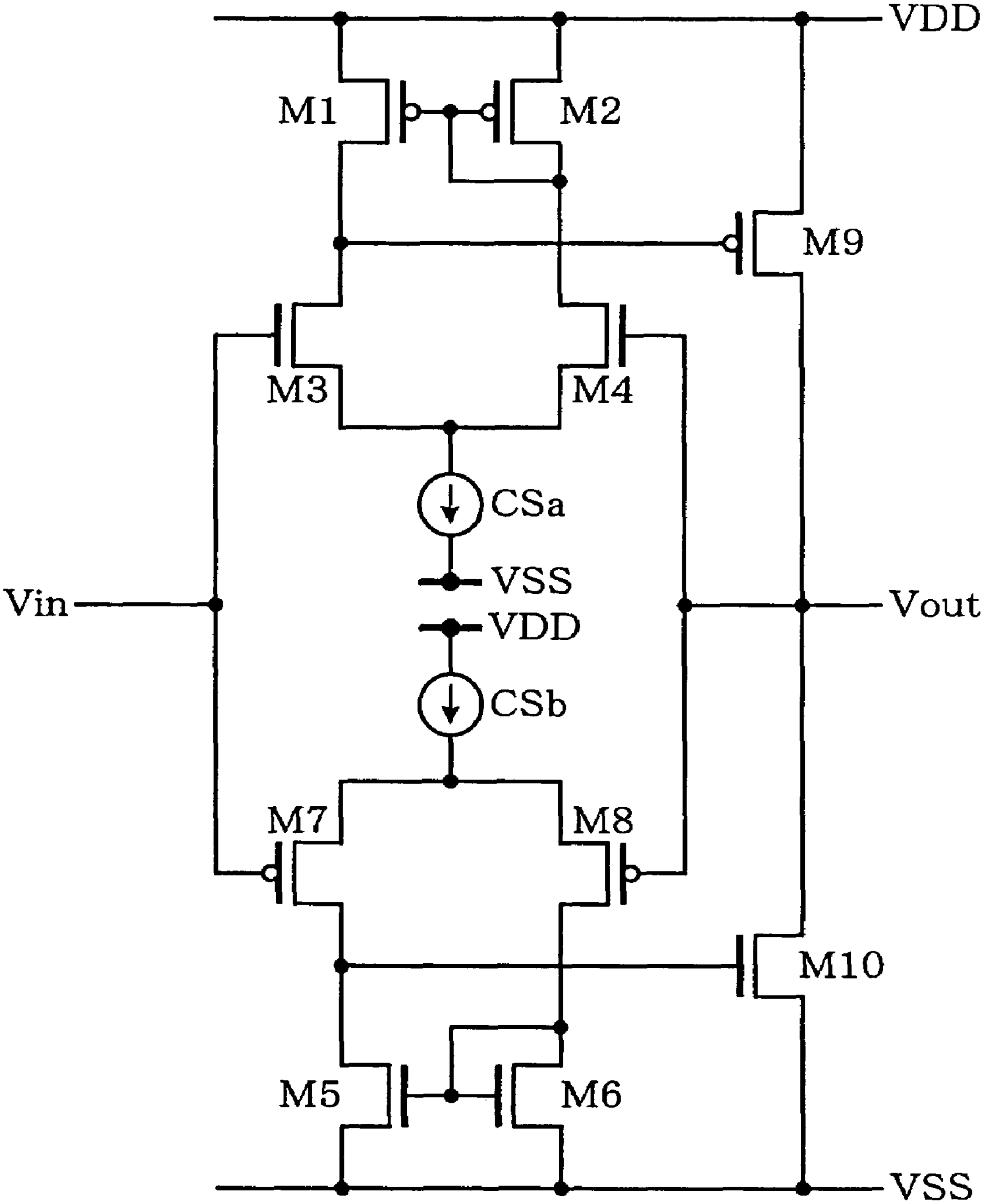
FIG. 21 is a diagram of a configuration of a known operational amplifier.
Figure 22:
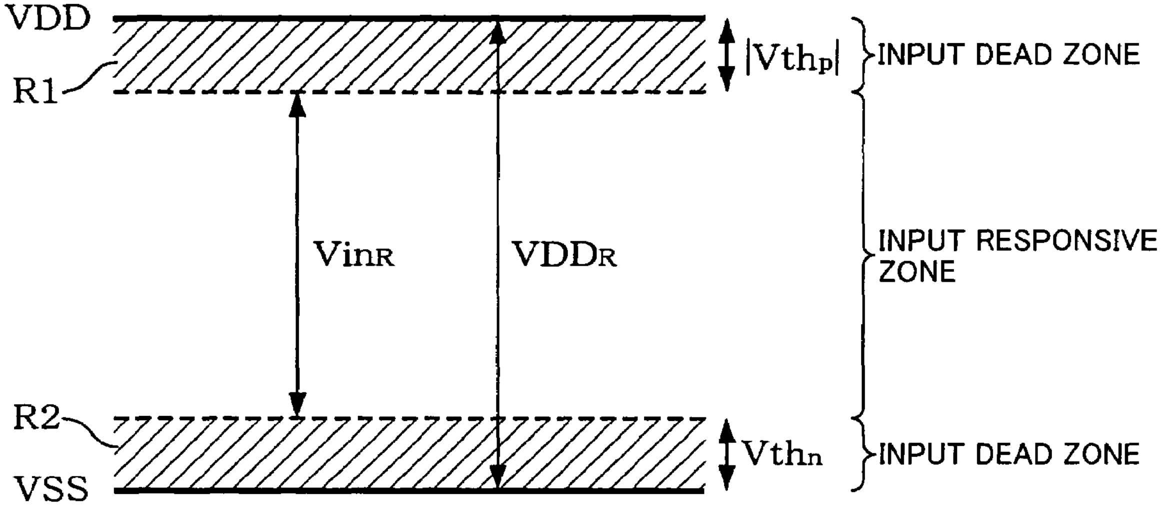
FIG. 22 is a diagram illustrative of an input dead zone.

When "VDD−|Vthp|≧Vin≧Vthn+VSS", the p-type transistor is turned ON, and the n-type transistor is turned ON. When the p-type transistor operates in the cutoff region, the linear region, or the saturation region corresponding to the gate voltage, the statement "the p-type transistor is turned ON" means that the p-type transistor is in the linear region or the saturation region. Therefore, the p-type differential amplifier circuit 100 operates (ON), and the n-type differential amplifier circuit 110 also operates (ON). In this case, the operation of the first auxiliary circuit 130 is turned ON or OFF, and the operation of the second auxiliary circuit 140 is turned ON or OFF. Specifically, the output nodes ND1 and ND2 do not become variable since the p-type differential amplifier circuit 100 and the n-type differential amplifier circuit 110 operate, and the output circuit 120 outputs the output signal Vout in the same manner as in the differential amplifier having the configuration shown in FIG. 21. Therefore, the first and second auxiliary circuits 130 and 140 may be or may not be operated. In FIG. 13, the first and second auxiliary circuits 130 and 140 are operated (ON).

When "Vthn+VSS>Vin≧VSS", the p-type transistor is turned ON, and the n-type transistor is turned OFF. When the n-type transistor operates in the cutoff region, the linear region, or the saturation region corresponding to the gate voltage, the statement "the n-type transistor is turned OFF" means that the n-type transistor is in the cutoff region. Therefore, the n-type differential amplifier circuit 110 does not operate (OFF), and the p-type differential amplifier circuit 100 operates (ON). Therefore, the second auxiliary circuit 140 is operated (ON) (caused to drive at least one of the output node ND2 (second output node) and the inversion output node NXD2 (second inversion output node)), and the first auxiliary circuit 130 is not operated (OFF). The voltage of the output node ND2 does not become variable, even if the input signal Vin is in the range of the input dead zone of the second differential transistor pair of the n-type differential amplifier circuit 110, by causing the second auxiliary circuit 140 to drive the output node ND2 (inversion output node NXD2) of the n-type differential amplifier circuit 110 in the range in which the n-type differential amplifier circuit 110 does not operate.

As described above, the gate voltages of the first and second driver transistors NTO1 and PTO1 of the output circuit 120 can be controlled by the first and second auxiliary circuits 130 and 140, whereby occurrence of unnecessary shoot-through current caused when the input signal Vin is in the range of the input dead zone can be prevented. Moreover, it becomes unnecessary to provide an offset taking into consideration the variations of the threshold voltage Vthp of the p-type transistor and the threshold voltage Vthn of the n-type transistor by eliminating the input dead zone of the input signal Vin. Therefore, since the operational amplifier can be formed using the voltage between the high-potential-side power supply voltage VDD and the low-potential-side power supply voltage VSS as the amplitude, the operating voltage can be reduced without decreasing the drive capability, whereby power consumption can be further reduced. This means mounting a voltage booster circuit and a reduction in voltage of the manufacturing process, whereby cost is reduced.

A detailed configuration example of the operational amplifier according to this embodiment is described below.

In FIG. 12, the p-type differential amplifier circuit 100 includes the first current source CS1, the first differential transistor pair, and the first current mirror circuit CM1. The drain of a p-type transistor PTS1 which is gate-controlled by the power save signal PS is connected with one end of the first current source CS1. The high-potential-side power supply voltage VDD (first power supply voltage) is supplied to the source of the p-type transistor PTS1. The other end of the first current source CS1 is connected with the sources of the p-type transistors PT1 and PT2 of the first differential transistor pair.

The first current mirror circuit CM1 includes an n-type (second conductivity type) first transistor pair of which the gates are connected. The first transistor pair includes n-type transistors NT1 and NT2. The low-potential-side power supply voltage VSS (second power supply voltage) is supplied to the sources of the n-type transistors NT1 and NT2. The drain of the n-type transistor NT1 is connected with the output node ND1 (first output node). The drain of the n-type transistor NT2 is connected with the inversion output node NXD1 (first inversion output node). The drain and the gate of the n-type transistor NT2 (transistor of the first differential transistor pair connected with the inversion output node NXD1) are connected.

The n-type differential amplifier circuit 110 includes the second current source CS2, the second differential transistor pair, and the second current mirror circuit CM2. The drain of an n-type transistor NTS1 which is gate-controlled by the inversion power save signal XPS generated by reversing the power save signal PS is connected with one end of the second current source CS2. The low-potential-side power supply voltage VSS (second power supply voltage) is supplied to the source of the n-type transistor NTS1. The other end of the second current source CS2 is connected with the sources of the n-type transistors NT3 and NT4 of the second differential transistor pair.

The second current mirror circuit CM2 includes a p-type (first conductivity type) second transistor pair of which the gates are connected. The second transistor pair includes p-type transistors PT3 and PT4. The high-potential-side power supply voltage VDD (first power supply voltage) is supplied to the sources of the p-type transistors PT3 and PT4. The drain of the p-type transistor PT3 is connected with the output node ND2 (second output node). The drain of the p-type transistor PT4 is connected with the inversion output node NXD2 (second inversion output node). The drain and the gate of the p-type transistor PT4 (transistor of the second transistor pair connected with the inversion output node NXD2) are connected.

The first auxiliary circuit 130 may include p-type (first conductivity type) first and second current driver transistors PA1 and PA2 and a first current control circuit 132. The high-potential-side power supply voltage VDD (first power supply voltage) is supplied to the sources of the first and second current driver transistors PA1 and PA2. The drain of the first current driver transistor PA1 is connected with the output node ND1 (first output node). The drain of the second current driver transistor PA2 is connected with the inversion output node NXD1 (first inversion output node).

The first current control circuit 132 controls the gate voltages of the first and second current driver transistors PA1 and PA2 based on the input signal Vin and the output signal Vout. In more detail, when the gate-source voltage (absolute value) of the p-type transistor PT1 of the first differential transistor pair to which the input signal Vin is input at the gate is smaller than the threshold voltage (absolute value) of the p-type transistor PT1, the first current control circuit 132 controls the gate voltages of the first and second current driver transistors PA1 and PA2 so that at least one of the output node ND1 (first output node) and the inversion output node NXD1 (first inversion output node) is driven.

The operational amplifier control section stops or limits the operating current of the first auxiliary circuit 130 by the inversion power save signal XPSR2R, whereby the operational amplifier can perform the non-rail-to-rail operation. In more detail, the operational amplifier control section stops or limits the operating current of the first current control circuit 132 by the inversion power save signal XPSR2R, whereby the operational amplifier can perform the non-rail-to-rail operation.

The second auxiliary circuit 140 may include n-type (second conductivity type) third and fourth current driver transistors NA3, and NA4 and a second current control circuit 142. The low-potential-side power supply voltage VSS (second power supply voltage) is supplied to the sources of the third and fourth current driver transistors NA3 and NA4. The drain of the third current driver transistor NA3 is connected with the output node ND2 (second output node). The drain of the fourth current driver transistor NA4 is connected with the inversion output node NXD2 (second inversion output node).

The second current control circuit 142 controls the gate voltages of the third and fourth current driver transistors NA3 and NA4 based on the input signal Vin and the output signal Vout. In more detail, when the gate-source voltage (absolute value) of the n-type transistor NT3 of the second differential transistor pair to which the input signal Vin is input at the gate is smaller than the threshold voltage (absolute value) of the n-type transistor NT3, the second current control circuit 142 controls the gate voltages of the third and fourth current driver transistors NA3 and NA4 so that at least one of the output node ND2 (second output node) and the inversion output node NXD2 (second inversion output node) is driven.

The operational amplifier control section stops or limits the operating current of the second auxiliary circuit 140 by the power save signal PSR2R, whereby the operational amplifier can perform the non-rail-to-rail operation. In more detail, the operational amplifier control section stops or limits the operating current of the second current control circuit 142 by the power save signal PSR2R, whereby the operational amplifier can perform the non-rail-to-rail operation.

Figure 14:
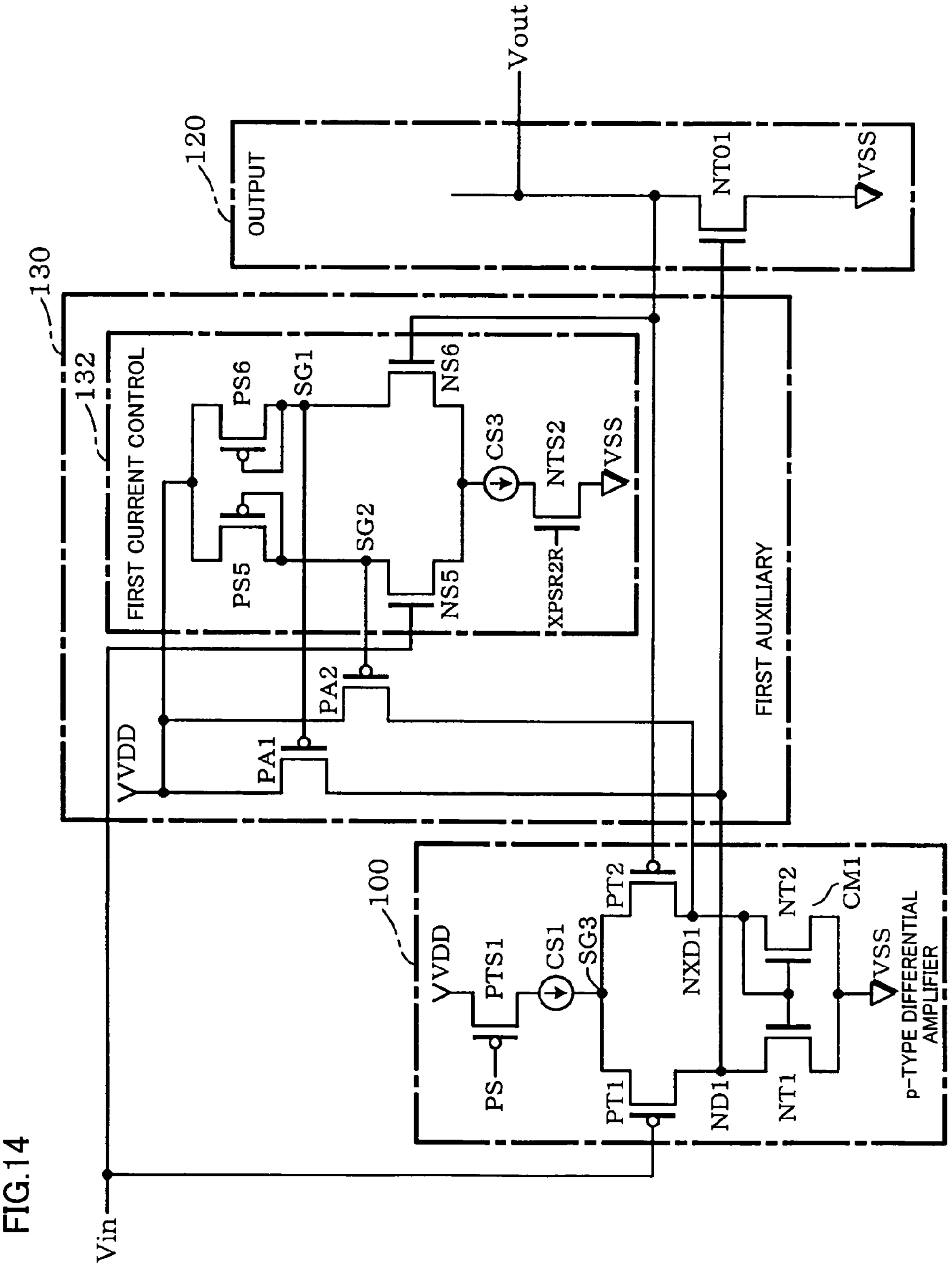
FIG. 14 is a circuit diagram of a configuration example of a first current control circuit.

FIG. 14 shows a configuration example of the first current control circuit 132. In FIG. 14, the same sections as the sections of the operational amplifier shown in FIG. 12 are indicated by the same symbols. Description of these sections is appropriately omitted.

The first current control circuit 132 includes a third current source CS3, an n-type (second conductivity type) third differential transistor pair, and p-type (first conductivity type) fifth and sixth current driver transistors PS5 and PS6.

The drain of an n-type transistor NTS2 which is gate-controlled by the inversion power save signal XPSR2R is connected with one end of the third current source CS3. The low-potential-side power supply voltage VSS (second power supply voltage) is supplied to the source of the n-type transistor NTS2.

The third differential transistor pair includes n-type transistors NS5 and NS6. The sources of the n-type transistors NS5 and NS6 are connected with the other end of the third current source CS3. The input signal Vin is input to the gate of the n-type transistor NS5. The output signal Vout is input to the gate of the n-type transistor NS6.

The high-potential-side power supply voltage VDD (first power supply voltage) is supplied to the sources of the fifth and sixth current driver transistors PS5 and PS6. The drain of the fifth current driver transistor PS5 is connected with the drain of the n-type transistor NS5 of the third differential transistor pair. The drain of the sixth current driver transistor PS6 is connected with the drain of the n-type transistor NS6 of the third differential transistor pair. The gate and the drain of the fifth current driver transistor PS5 are connected. The gate and the drain of the sixth current driver transistor PS6 are connected.

The drain of the n-type transistor NS5 of the third differential transistor pair (transistor of the third differential transistor pair to which the input signal Vin is input at the gate) (or, the drain of the fifth current driver transistor PS5) is connected with the gate of the second current driver transistor PA2. The drain of the n-type transistor NS6 of the third differential transistor pair (transistor of the third differential transistor pair to which the output signal Vout is input at the gate) (or, the drain of the sixth current driver transistor PS6) is connected with the gate of the first current driver transistor PA1.

Specifically, the first and sixth current driver transistors PA1 and PS6 form a current mirror circuit. Likewise, the second and fifth current driver transistors PA2 and PS5 form a current mirror circuit.

Figure 15:
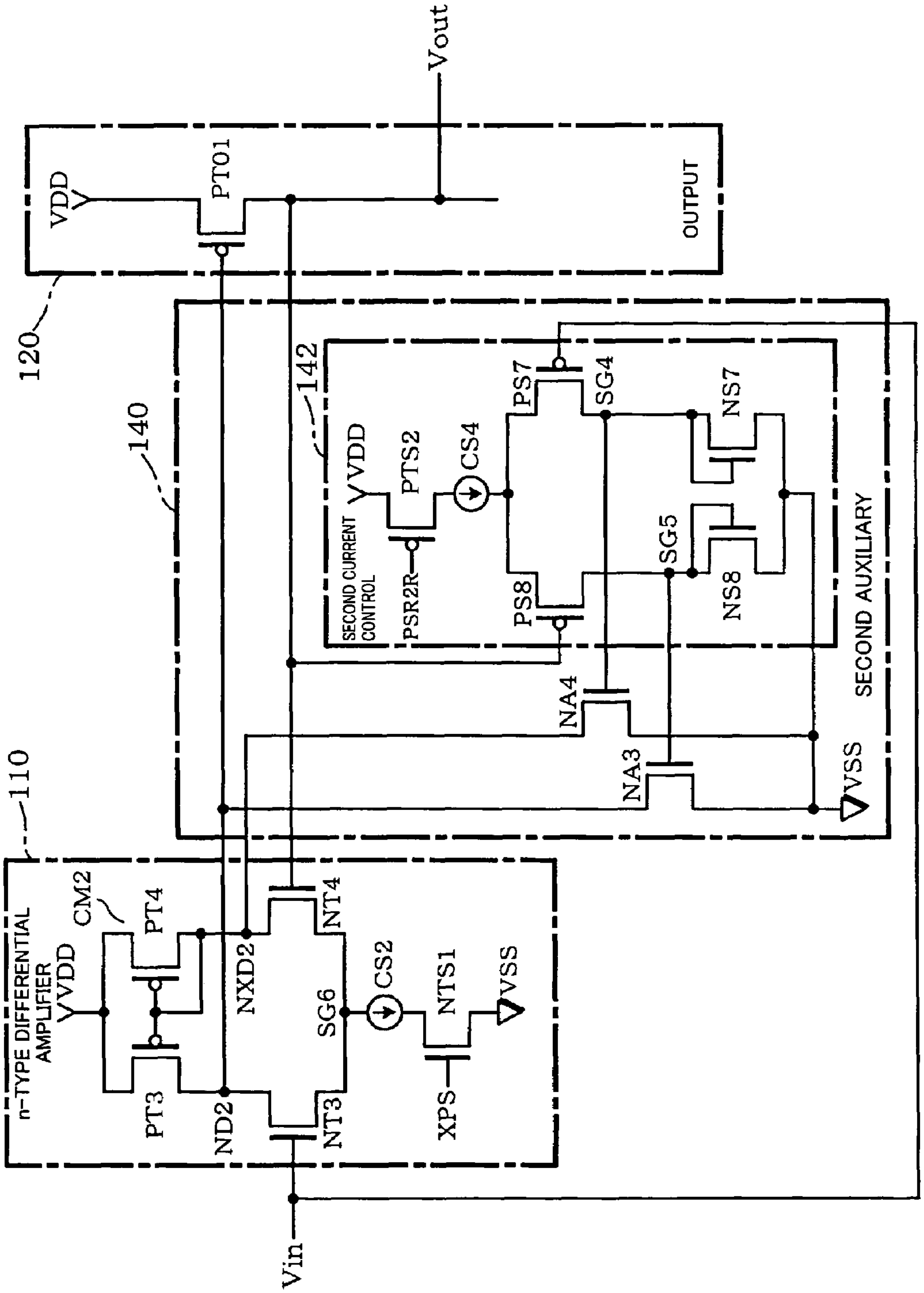
FIG. 15 is a circuit diagram of a configuration example of a second current control circuit.

FIG. 15 shows a configuration example of the second current control circuit 142. In FIG. 15, the same sections as the sections of the operational amplifier shown in FIG. 12 are indicated by the same symbols. Description of these sections is appropriately omitted.

The second current control circuit 142 includes a fourth current source CS4, a p-type (first conductivity type) fourth differential transistor pair, and n-type (second conductivity type) seventh and eighth current driver transistors NS7 and NS8.

The drain of a p-type transistor PTS2 which is gate-controlled by the power save signal PSR2R is connected with one end of the fourth current source CS4. The high-potential-side power supply voltage VDD (first power supply voltage) is supplied to the source of the p-type transistor PTS2.

The fourth differential transistor pair includes p-type transistors PS7 and PS8. The sources of the p-type transistors PS7 and PS8 are connected with the other end of the fourth current source CS4. The input signal Vin is input to the gate of the p-type transistor PS7. The output signal Vout is input to the gate of the p-type transistor PS8.

The low-potential-side power supply voltage VSS (second power supply voltage) is supplied to the sources of the seventh and eighth current driver transistors NS7 and NS8. The drain of the seventh current driver transistor NS7 is connected with the drain of the p-type transistor PS7 of the fourth differential transistor pair. The drain of the eighth current driver transistor NS8 is connected with the drain of the p-type transistor PS8 of the fourth differential transistor pair. The gate and the drain of the seventh current driver transistor NS7 are connected. The gate and the drain of the eighth current driver transistor NS8 are connected.

The drain of the p-type transistor PS7 of the fourth differential transistor pair (transistor of the fourth differential transistor pair to which the input signal Vin is input at the gate) (or, the drain of the seventh current driver transistor NS7) is connected with the gate of the fourth current driver transistor NA4. The drain of the p-type transistor PS8 of the fourth differential transistor pair (transistor of the fourth differential transistor pair to which the output signal Vout is input at the gate) (or, the drain of the eighth current driver transistor NS8) is connected with the gate of the third current driver transistor NA3.

Specifically, the third and eighth current driver transistors NA3 and NS8 form a current mirror circuit. Likewise, the fourth and seventh current driver transistors NA4 and NS7 form a current mirror circuit.

The rail-to-rail operation of the operational amplifier having the configuration shown in FIG. 12 is described below taking the case where the first auxiliary circuit 130 includes the first current control circuit 132 having the configuration shown in FIG. 14 and the second auxiliary circuit 140 includes the second current control circuit 142 having the configuration shown in FIG. 15.

When "Vthn+VSS≧Vin>VSS", the p-type transistor PT1 is turned ON so that the p-type differential amplifier circuit 100 normally operates. On the other hand, since the n-type transistor NT3 is not turned ON, the voltage of each node of the n-type differential amplifier circuit 110 becomes variable.

In the second auxiliary circuit 140, since the p-type transistor PS7 is turned ON to decrease the impedance, the gate voltage of the fourth current driver transistor NA4 increases. As a result, the impedance of the fourth current driver transistor NA4 decreases. Specifically, the fourth current driver transistor NA4 drives the inversion output node NXD2 to remove current, whereby the potential of the inversion output node NXD2 decreases. As a result, the impedance of the p-type transistor PT3 decreases, whereby the potential of the output node ND2 increases. Then, the impedance of the second driver transistor PTO1 of the output circuit 120 increases, whereby the potential of the output signal Vout decreases. This decreases the impedance of the p-type transistor PS8, whereby the gate voltage of the third current driver transistor NA3 increases. Therefore, the impedance of the third current driver transistor NA3 decreases, whereby the potential of the output node ND2 decreases.

The result whereby the potential of the output node ND2 is increased by decreasing the impedance of the p-type transistor PT3 is fed back to decrease the impedance of the third current driver transistor NA3, whereby the potential of the output node ND2 is decreased. As a result, the operational amplifier transitions to an equilibrium in which the voltage of the input signal Vin is approximately equal to the voltage of the output signal Vout, whereby the gate voltage of the second driver transistor PTO1 is set at an optimum value.

When "VDD≧Vin>VDD−|Vthp|", the operation of the operational amplifier is the reverse of the above-described operation. Specifically, the n-type transistor NT3 is turned ON so that the n-type differential amplifier circuit 110 normally operates. On the other hand, since the p-type transistor PT1 is not turned ON, the voltage of each node of the p-type differential amplifier circuit 100 becomes variable.

In the first auxiliary circuit 130, since the n-type transistor NS5 is turned ON to decrease the impedance, the gate voltage of the second current driver transistor PA2 decreases. As a result, the impedance of the second current driver transistor PA2 decreases. Specifically, the second current driver transistor PA2 drives the inversion output node NXD1 to supply current, whereby the potential of the inversion output node NXD1 increases. As a result, the impedance of the n-type transistor NT2 decreases, whereby the potential of the output node ND1 decreases. Then, the impedance of the first driver transistor NTO1 of the output circuit 120 increases, whereby the potential of the output signal Vout increases. This decreases the impedance of the n-type transistor NS6, whereby the gate voltage of the first current driver transistor PA1 decreases. Therefore, the impedance of the first current driver transistor PA1 decreases, whereby the potential of the output node ND1 increases.

The result whereby the potential of the output node ND1 is increased by decreasing the impedance of the n-type transistor NT2 is fed back to decrease the impedance of the first current driver transistor PA1, whereby the potential of the output node ND1 is increased. As a result, the operational amplifier transitions to an equilibrium in which the voltage of the input signal Vin is approximately equal to the voltage of the output signal Vout, whereby the gate voltage of the first driver transistor NTO1 is set at an optimum value.

When "VDD−|Vthp|In≧Vin≧Vthn+VSS", since the p-type differential amplifier circuit 100 and the n-type differential amplifier circuit 110 operate so that the potentials of the output nodes ND1 and ND2 are set, the operational amplifier transitions to an equilibrium in which the voltage of the input signal Vin is approximately equal to the voltage of the output signal Vout even if the first and second auxiliary circuits 130 and 140 are not operated.

Figure 16:
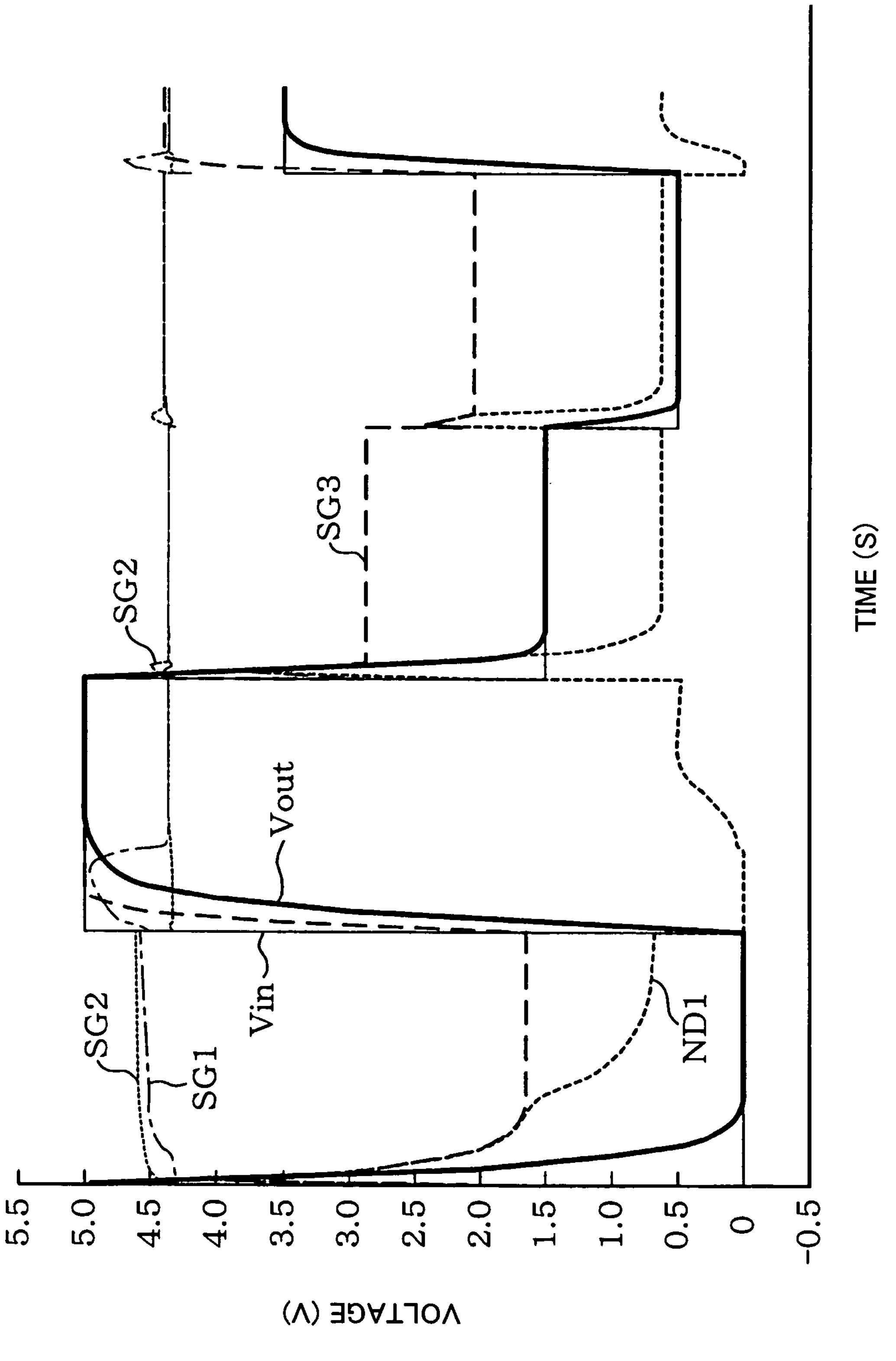
FIG. 16 is a diagram showing simulation results for changes in voltage of nodes of a p-type differential amplifier circuit and a first auxiliary circuit.
Figure 17:
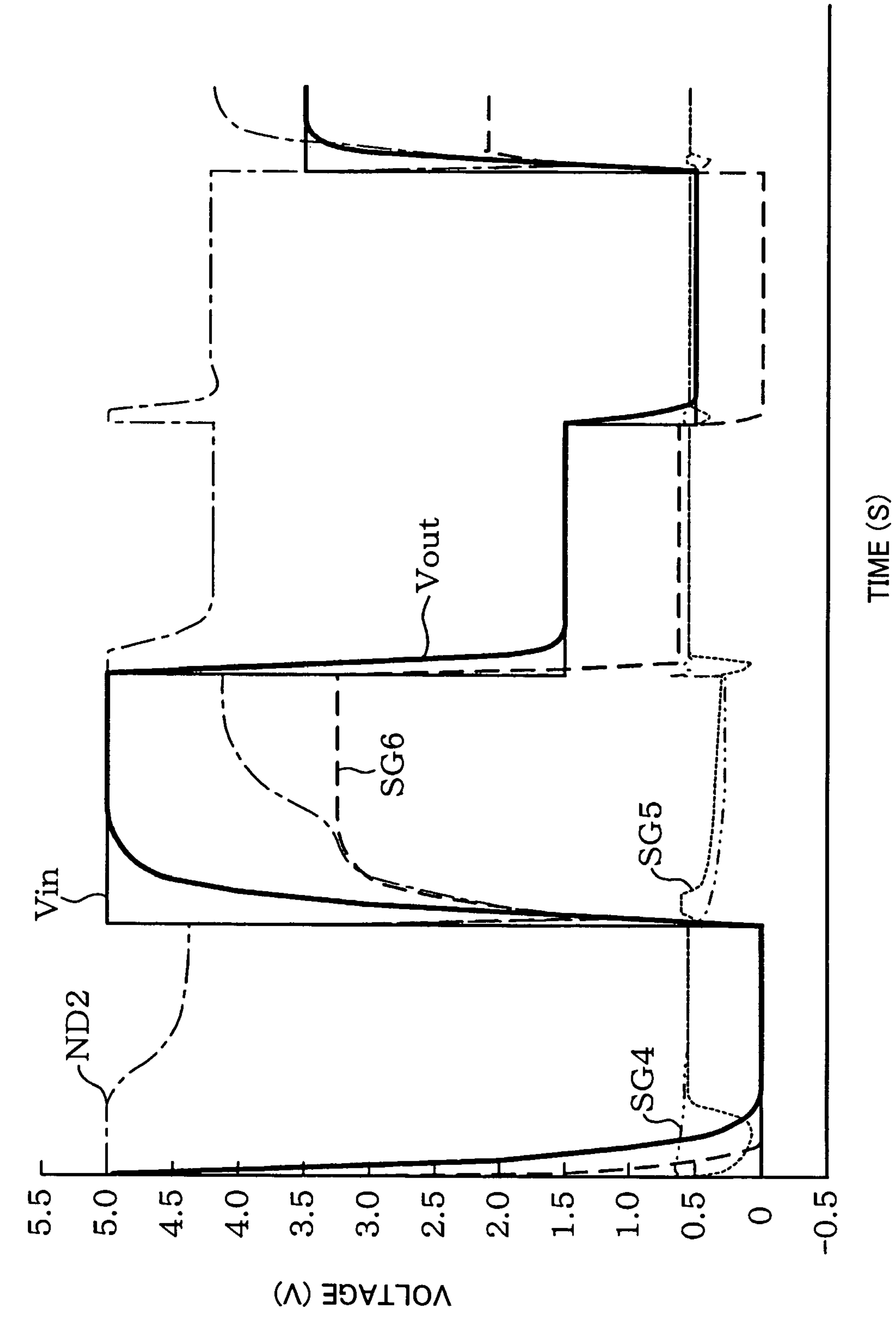
FIG. 17 is a diagram showing simulation results for changes in voltage of nodes of an n-type differential amplifier circuit and a second auxiliary circuit.
Figure 18:
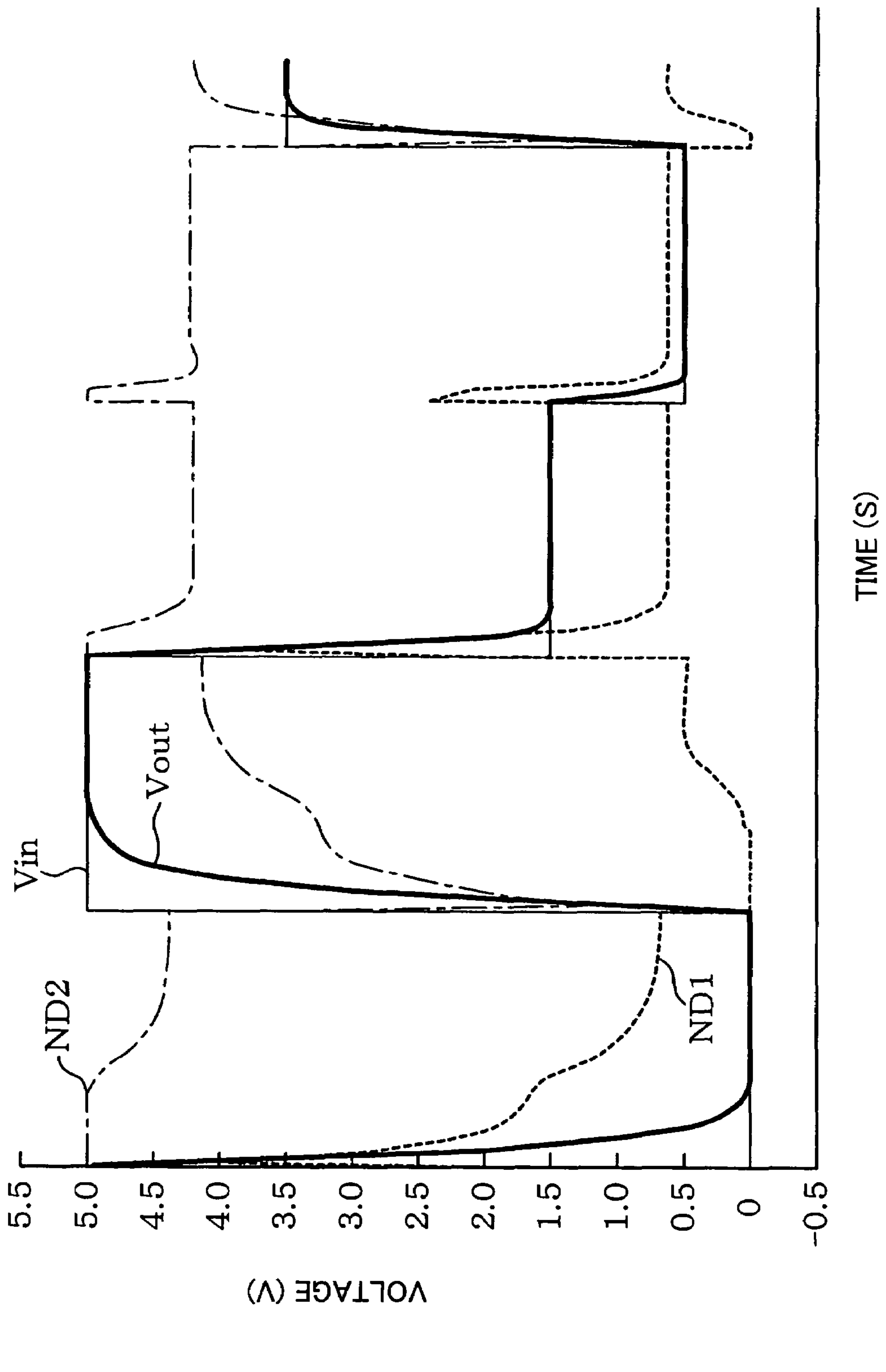
FIG. 18 is a diagram showing simulation results for changes in voltage of output nodes.

FIG. 16 shows simulation results of changes in voltage of the nodes of the p-type differential amplifier circuit 100 and the first auxiliary circuit 130. FIG. 17 shows simulation results of changes in voltage of the nodes of the n-type differential amplifier circuit 110 and the second auxiliary circuit 140. FIG. 18 shows simulation results of changes in voltage of the output nodes ND1 and ND2.

In FIG. 16, a node SG1 is the gate of the first current driver transistor PA1. A node SG2 is the gate of the second current driver transistor PA2. A node SG3 is the sources of the p-type transistors PT1 and PT2 of the first differential transistor pair.

In FIG. 17, a node SG4 is the gate of the fourth current driver transistor NA4. A node SG5 is the gate of the third current driver transistor NA3. A node SG6 provides the source for the n-type transistor NT3 and the n-type transistor NT4 of the second differential transistor pair.

As shown in FIGS. 15 to 18, even if the input signal Vin at about 0.5 V is input, the output node ND1 does not become variable and controls the gate voltage of the first driver transistor NTO1 of the output circuit 120.

As described above, this embodiment enables control which eliminates the input dead zone, allows the rail-to-rail operation, and reliably prevents a shoot-through current of the output circuit 120. Therefore, an operational amplifier which realizes a significant reduction in power consumption can be provided. Moreover, since the class AB operation becomes possible, the data lines can be stably driven regardless of the polarity in the polarity inversion drive which reverses the polarity of the voltage applied to the liquid crystal.

The power save control of the p-type differential amplifier circuit 100, the n-type differential amplifier circuit 110, and the first and second auxiliary circuits 130 and 140 is independently performed by the power save signal PS (inversion power save signal XPS) and the power save signal PSR2R (inversion power save signal XPSR2R). As a result, current consumption by an unnecessary rail-to-rail operation can be reduced corresponding to the grayscale characteristics.

2.1.2.1 Adjustment of Current Value

In the operational amplifier according to this embodiment, the circuit stability can be improved by further preventing the oscillation of the operational amplifier by optimizing the current values of the current sources of the p-type differential amplifier circuit 100, the n-type differential amplifier circuit 110, the first auxiliary circuit 130, and the second auxiliary circuit 140 during operation.

Figure 19:
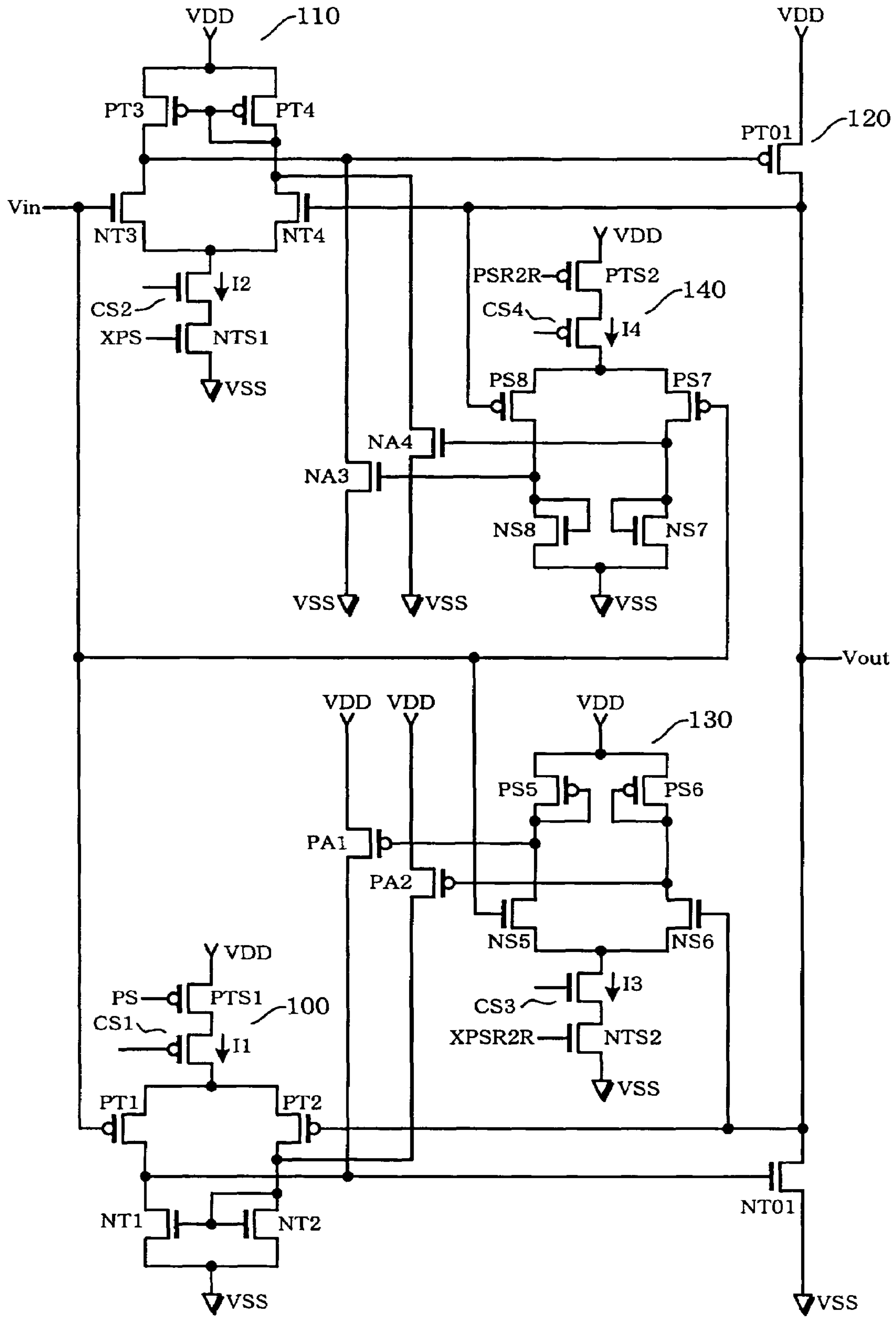
FIG. 19 is a circuit diagram of another configuration example of the operational amplifier according to one embodiment of the invention.

FIG. 19 is a circuit diagram of another configuration example of the operational amplifier according to this embodiment. In FIG. 19, each current source is formed by a transistor. In this case, unnecessary current consumption of the current source can be reduced by controlling the gate voltage of each transistor.

In order to prevent the oscillation of the operational amplifier according to this embodiment, it is effective to equalize the drain currents of the first and second driver transistors NTO1 and PTO1 of the output circuit 120. The drain current of the first driver transistor NTO1 is determined by a current value I1 of the first current source CS1 of the p-type differential amplifier circuit 100 during operation and a current value I3 of the third current source CS3 of the first auxiliary circuit 130 during operation. The drain current of the second driver transistor PTO1 is determined by a current value I2 of the second current source CS2 of the n-type differential amplifier circuit 110 during operation and a current value I4 of the fourth current source CS4 of the second auxiliary circuit 140 during operation.

Consider the case where the current value I1 is not equal to the current value I3. For example, the current value I1 is "10" and the current value I3 is "5". Likewise, consider the case where the current value I2 is not equal to the current value I4. For example, the current value I2 is "10" and the current value I4 is "5".

When the voltage of the input signal Vin is in such a range that the p-type differential amplifier circuit 100 and the first auxiliary circuit 130 operate, the drain current of the first driver transistor NTO1 flows in an amount corresponding to "15" (=I1+I3=10+5), for example. Likewise, when the voltage of the input signal Vin is in such a range that the n-type differential amplifier circuit 110 and the second auxiliary circuit 140 operate, the drain current of the second driver transistor PTO1 flows in an amount corresponding to "15" (=I2+I4=10+5), for example.

On the other hand, when the voltage of the input signal Vin decreases to such an extent that the n-type transistor does not operate, the n-type differential amplifier circuit 110 and the first auxiliary circuit 130 stop the operation. Therefore, current does not flow through the second and third current sources CS2 and CS3 (I2=0, I3=0). Therefore, the drain current of the first driver transistor NTO1 flows in an amount corresponding to "10" (=I1), and the drain current of the second driver transistor PTO1 flows in an amount corresponding to "5" (=I4), for example. This also applies to the case where the voltage of the input signal Vin increases to such an extent that the p-type transistor does not operate, for example.

As described above, when the rising edge or the falling edge of the output signal Vout differs due to the difference in drain current between the first and second driver transistors NTO1 and PTO1 of the output circuit 120, the time in which the output becomes stable differs, whereby oscillation of the operational amplifier tends to occur.

Therefore, in the operational amplifier according to this embodiment, it is preferable that the current values of the first and third current sources CS1 and CS3 during operation be equal (I1=I3) and that the current values of the second and fourth current sources CS2 and CS4 during operation be equal (I2=I4). This is achieved by equalizing the channel lengths L of the transistors forming the first to fourth current sources CS1 to CS4, equalizing the channel widths of the transistors forming the first and third current sources CS1 and CS3, and equalizing the channel widths of the transistors forming the second and fourth current sources CS2 and CS4.

It is also preferable that the current values of the first to fourth current sources CS1 to CS4 during operation be equal (I1=I2=I3=I4). This facilitates the design.

In addition, power consumption can be further reduced by reducing at least one of the current values of the third and fourth current sources CS3 and CS4 during operation. In this case, it is necessary to reduce at least one of the current values of the third and fourth current sources CS3 and CS4 during operation without decreasing the current drive capability of the first to fourth current driver transistors PA1, PA2, NA3, and NA4.

Figure 20:
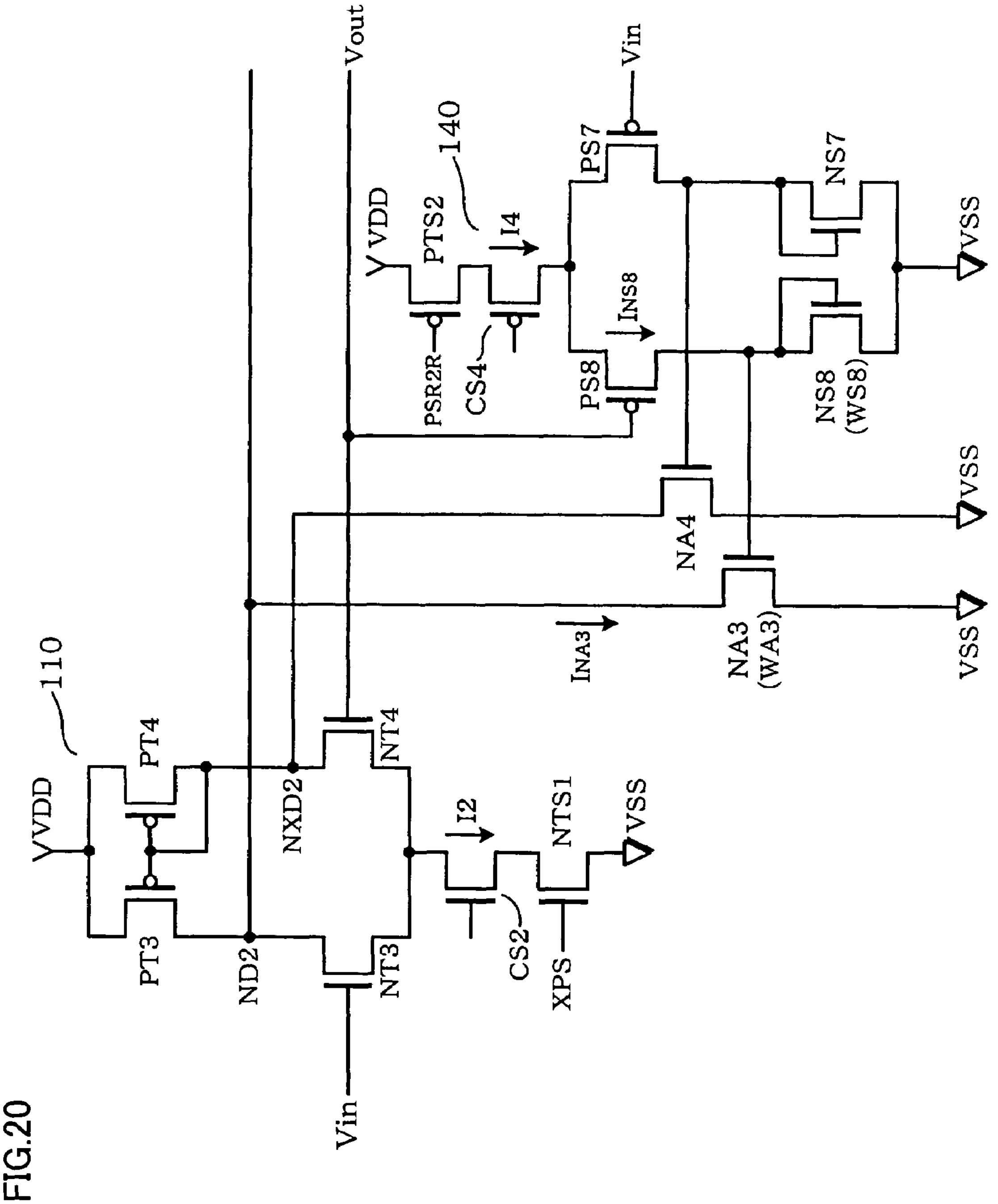
FIG. 20 is a diagram illustrative of a configuration example which reduces a current value of a fourth current source during operation.

FIG. 20 is a diagram illustrative of a configuration example of reducing the current value of the fourth current source CS4 during operation. In FIG. 20, the same sections as shown in FIGS. 12, 15, and 19 are indicated by the same symbols. Description of these sections is appropriately omitted.

In FIG. 20, the current value of the fourth current source CS4 during operation is reduced by utilizing the configuration in which the third and eighth current driver transistors NA3 and NS8 form a current mirror circuit. The channel length and the channel width of the third current driver transistor NA3 are respectively indicated by L and WA3, the drain current of the third current driver transistor NA3 is indicated by $I_{NA3}$, the channel length and the channel width of the eighth current driver transistor NS8 are respectively indicated by L and WS8, and the drain current of the eighth current driver transistor NS8 is indicated by $I_{NS8}$. In this case, $I_{NA3}$ equals "(WA3/WS8)×$I_{NS8}$". The ratio "WA3/WS8" indicates the ratio of the current drive capability of the third current driver transistor NA3 to the current drive capability of the eighth current driver transistor NS8. Therefore, the drain current $I_{NS8}$ can be reduced without decreasing the current drive capability of the third current driver transistor NA3 by making the ratio "WA3/WS8" greater than one, whereby the current value I4 of the fourth current source CS4 during operation can be reduced.

Note that the current value may be reduced by utilizing the configuration shown in FIG. 20 in which the fourth and seventh current driver transistors NA4 and NS7 form a current mirror circuit.

Likewise, it is preferable to reduce the current value of the third current source CS3 during operation. In this case, the current value of the third current source CS3 is reduced by utilizing the configuration in which the first and sixth current driver transistors PA1 and PS6 form a current mirror circuit or the configuration in which the second and fifth current driver transistors PA2 and PS5 form a current mirror circuit.

As described above, at least one of the ratio of the current drive capability of the first current driver transistor PA1 to the current drive capability of the sixth current driver transistor PS6, the ratio of the current drive capability of the second current driver transistor PA2 to the current drive capability of the fifth current driver transistor PS5, the ratio of the current drive capability of the third current driver transistor NA3 to the current drive capability of the eighth current driver transistor NS8, and the ratio of the current drive capability of the fourth current driver transistor NA4 to the current drive capability of the seventh current driver transistor NS7 is set at a value greater than one. This reduces the current value of at least one of the third and fourth current sources CS3 and CS4 during operation.

The invention is not limited to the above-described embodiments. Various modifications and variations may be made within the spirit and scope of the invention. Although the above embodiment illustrates the case of applying the invention to the liquid crystal display panel as the display panel, the invention is not limited thereto. Although the above embodiment illustrates the case of using a MOS transistor as each transistor, the invention is not limited thereto.

For example, the invention is not limited to the operational amplifier having the configuration described with reference to FIGS. 12 to 20, but may also be applied to an operational amplifier of which the rail-to-rail operation and the non-rail-to-rail operation can be switched. The configuration of the grayscale characteristic determination section 560 is not limited to the configuration shown in FIG. 9.

The configurations of the operational amplifier and the p-type differential amplifier circuit, the n-type differential amplifier circuit, the output circuit, the first auxiliary circuit, and the second auxiliary circuit forming the operational amplifier are not limited to the configurations described in the above embodiment. Various configurations equivalent to these configurations may also be employed.

Some of the requirements of any claim of the invention may be omitted from a dependent claim which depends on that claim. Moreover, some of the requirements of any independent claim of the invention may be allowed to depend on any other independent claim.

Although only some embodiments of the invention are described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A driver circuit for driving data lines of an electro-optical device, the driver circuit comprising:

an operational amplifier which drives the data line by a rail-to-rail operation or a non-rail-to-rail operation based on a grayscale voltage corresponding to one of first to Pth (P is an integer of four or more) grayscale values; and an operational amplifier control section which causes the operational amplifier to perform the rail-to-rail operation or the non-rail-to-rail operation based on grayscale data;

when the sth ($1 \leqq s \leqq P$, s is an integer) grayscale value corresponding to the grayscale data is in a range of the qth ($1<q<P$, q is an integer) to rth ($q<r<P$, r is an integer) grayscale values, the operational amplifier driving the data line by the non-rail-to-rail operation based on the grayscale voltage corresponding to the sth grayscale value; and when the sth grayscale value is not in the range of the qth to rth grayscale values, the operational amplifier driving the data line by the rail-to-rail operation based on the grayscale voltage corresponding to the sth grayscale value.

2. The driver circuit as defined in claim 1, wherein the operational amplifier control section causes the operational amplifier to perform the rail-to-rail operation or the non-rail-to-rail operation for the grayscale value in the range of the qth to rth grayscale values based on higher-order two-bit data of the grayscale data; and wherein, when the operation of the operational amplifier has been switched by the operational amplifier control section so that the operational amplifier performs the rail-to-rail operation for the grayscale value in the range of the qth to rth grayscale values, the operational amplifier drives the data line by the rail-to-rail operation regardless of the grayscale value.

3. The driver circuit as defined in claim 1, comprising:

a comparison section which compares the grayscale voltage corresponding to the qth grayscale value with a first threshold value, and compares the grayscale voltage corresponding to the rth grayscale value with a second threshold value;

wherein the operational amplifier control section causes the operational amplifier to perform the rail-to-rail operation or the non-rail-to-rail operation for the grayscale value in the range of the qth to rth grayscale values based on a comparison result of the comparison section; and wherein, when the operation of the operational amplifier has been switched by the operational amplifier control section so that the operational amplifier performs the rail-to-rail operation for the grayscale value in the range of the qth to rth grayscale values, the operational amplifier drives the data line by the rail-to-rail operation regardless of the grayscale value.

4. The driver circuit as defined in claim 3, wherein the operational amplifier control section causes the operational amplifier to perform the non-rail-to-rail operation for the grayscale value in the range of the qth to rth grayscale values on condition that the grayscale voltage corresponding to the qth grayscale value is equal to or less than the first threshold value and the grayscale voltage corresponding to the rth grayscale value is equal to or greater than the second threshold value, or the grayscale voltage corresponding to the rth grayscale value is equal to or greater than the first threshold value and the grayscale voltage corresponding to the qth grayscale value is equal to or less than the second threshold value.

5. The driver circuit as defined in claim 3, comprising:

a threshold storage section which stores the first and second threshold values corresponding to a power supply voltage range of the operational amplifier and an output amplitude voltage supplied to the data line;

wherein the comparison section performs the comparison based on information stored in the threshold storage section.

6. The driver circuit as defined in claim 5, comprising:

an output amplitude voltage setting register for setting the output amplitude voltage; and an offset voltage setting register for setting an offset voltage for the output amplitude voltage;

wherein the comparison section performs the comparison based on the information stored in the threshold storage section corresponding to the output amplitude voltage set in the output amplitude voltage setting register and an addition result of the output amplitude voltage and the offset voltage set in the offset voltage setting register.

7. The driver circuit as defined in claim 1, wherein the operational amplifier includes:

a first conductivity type differential amplifier circuit which includes a first conductivity type first differential transistor pair, sources of the transistors being connected with a first current source and an input signal and an output signal being respectively input to gates of the transistors, and a first current mirror circuit which generates drain currents of the transistors of the first differential transistor pair;

a second conductivity type differential amplifier circuit which includes a second conductivity type second differential transistor pair, sources of the transistors being connected with a second current source and the input signal and the output signal being respectively input to gates of the transistors, and a second current mirror circuit which generates drain currents of the transistors of the second differential transistor pair;

a first auxiliary circuit which drives at least one of a first output node and a first inversion output node which are drains of the transistors of the first differential transistor pair based on the input signal and the output signal;

a second auxiliary circuit which drives at least one of a second output node and a second inversion output node which are drains of the transistors of the second differential transistor pair based on the input signal and the output signal; and an output circuit which includes a second conductivity type first driver transistor of which gate voltage is controlled based on voltage of the first output node, and a first conductivity type second driver transistor of which a drain is connected with a drain of the first driver transistor and of which gate voltage is controlled based on voltage of a second output node, and outputs voltage of the drain of the first driver transistor as the output signal;

wherein, when an absolute value of a gate-source voltage of the transistor of the first differential transistor pair to which the input signal is input at the gate is smaller than an absolute value of a threshold voltage of the transistor, the first auxiliary circuit controls the gate voltage of the first driver transistor by driving at least one of the first output node and the first inversion output node;

wherein, when an absolute value of a gate-source voltage of the transistor of the second differential transistor pair to which the input signal is input at the gate is smaller than an absolute value of a threshold voltage of the transistor, the second auxiliary circuit controls the gate voltage of the second driver transistor by driving at least one of the second output node and the second inversion output node; and wherein the operational amplifier control section stops or limits an operating current of at least one of the first and second auxiliary circuits, whereby the operational amplifier performs the non-rail-to-rail operation.

8. The driver circuit as defined in claim 1, wherein the operational amplifier includes:

a first conductivity type differential amplifier circuit which amplifies a difference between an input signal and an output signal;

a second conductivity type differential amplifier circuit which amplifies the difference between the input signal and the output signal;

a first auxiliary circuit which drives at least one of a first output node and a first inversion output node of the first conductivity type differential amplifier circuit based on the input signal and the output signal;

a second auxiliary circuit which drives at least one of a second output node and a second inversion output node of the second conductivity type differential amplifier circuit based on the input signal and the output signal; and an output circuit which generates the output signal based on voltages of the first and second output nodes;

wherein the first conductivity type differential amplifier circuit includes:

a first current source to which a first power supply voltage is supplied at one end;

a first conductivity type first differential transistor pair, sources of the transistors being connected with the other end of the first current source, drains of the transistors being respectively connected with the first output node and the first inversion output node, and the input signal and the output signal being respectively input to gates of the transistors; and a first current mirror circuit which includes a second conductivity type first transistor pair of which gates are connected, a second power supply voltage being supplied to sources of the transistors of the first transistor pair, drains of the transistors being respectively connected with the first output node and the first inversion output node, and the drain and the gate of the transistor of the first transistor pair which is connected with the first inversion output node being connected;

wherein the second conductivity type differential amplifier circuit includes:

a second current source to which the second power supply voltage is supplied at one end;

a second conductivity type second differential transistor pair, sources of the transistors being connected with the other end of the second current source, drains of the transistors being respectively connected with the second output node and the second inversion output node, and the input signal and the output signal being respectively input to gates of the transistors; and a second current mirror circuit which includes a first conductivity type second transistor pair of which gates are connected, the first power supply voltage being supplied to sources of the transistors of the second transistor pair, drains of the transistors being respectively connected with the second output node and the second inversion output node, and the drain and the gate of the transistor of the second transistor pair which is connected with the second inversion output node being connected;

wherein the output circuit includes a first conductivity type second driver transistor of which a gate is connected with the second output node, and a second conductivity type first driver transistor of which a gate is connected with the first output node and a drain is connected with a drain of the second driver transistor, and outputs voltage of the drain of the first driver transistor as the output signal;

wherein, when an absolute value of a gate-source voltage of the transistor of the first differential transistor pair to which the input signal is input at the gate is smaller than an absolute value of a threshold voltage of the transistor, the first auxiliary circuit controls a gate voltage of the first driver transistor by driving at least one of the first output node and the first inversion output node;

wherein, when an absolute value of a gate-source voltage of the transistor of the second differential transistor pair to which the input signal is input at the gate is smaller than an absolute value of a threshold voltage of the transistor, the second auxiliary circuit controls a gate voltage of the second driver transistor by driving at least one of the second output node and the second inversion output node; and wherein the operational amplifier control section stops or limits an operating current of at least one of the first and second auxiliary circuits, whereby the operational amplifier performs the non-rail-to-rail operation.

9. The driver circuit as defined in claim 7, wherein the first auxiliary circuit includes:

first conductivity type first and second current driver transistors, the first power supply voltage being supplied to sources of the first and second current driver transistors and drains of the first and second current driver transistors being respectively connected with the first output node and the first inversion output node; and a first current control circuit which controls gate voltages of the first and second current driver transistors based on the input signal and the output signal;

wherein, when an absolute value of a gate-source voltage of the transistor of the first differential transistor pair to which the input signal is input at the gate is smaller than an absolute value of a threshold voltage of the transistor, the first current control circuit controls the gate voltages of the first and second current driver transistors so that at least one of the first output node and the first inversion output node is driven; and wherein the operational amplifier control section stops or limits an operating current of the first current control circuit.

10. The driver circuit as defined in claim 8, wherein the first auxiliary circuit includes:

first conductivity type first and second current driver transistors, the first power supply voltage being supplied to sources of the first and second current driver transistors and drains of the first and second current driver transistors being respectively connected with the first output node and the first inversion output node; and a first current control circuit which controls gate voltages of the first and second current driver transistors based on the input signal and the output signal;

wherein, when an absolute value of a gate-source voltage of the transistor of the first differential transistor pair to which the input signal is input at the gate is smaller than an absolute value of a threshold voltage of the transistor, the first current control circuit controls the gate voltages of the first and second current driver transistors so that at least one of the first output node and the first inversion output node is driven; and wherein the operational amplifier control section stops or limits an operating current of the first current control circuit.

11. The driver circuit as defined in claim 7, wherein the second auxiliary circuit includes:

second conductivity type third and fourth current driver transistors, the second power supply voltage being supplied to sources of the third and fourth current driver transistors and drains of the third and fourth current driver transistors being respectively connected with the second output node and the second inversion output node; and a second current control circuit which controls gate voltages of the third and fourth current driver transistors based on the input signal and the output signal;

wherein, when an absolute value of a gate-source voltage of the transistor of the second differential transistor pair to which the input signal is input at the gate is smaller than an absolute value of a threshold voltage of the transistor, the second current control circuit controls the gate voltages of the third and fourth current driver transistors so that at least one of the second output node and the second inversion output node is driven; and wherein the operational amplifier control section stops or limits an operating current of the second current control circuit.

12. The driver circuit as defined in claim 8, wherein the second auxiliary circuit includes:

second conductivity type third and fourth current driver transistors, the second power supply voltage being supplied to sources of the third and fourth current driver transistors and drains of the third and fourth current driver transistors being respectively connected with the second output node and the second inversion output node; and a second current control circuit which controls gate voltages of the third and fourth current driver transistors based on the input signal and the output signal;

wherein, when an absolute value of a gate-source voltage of the transistor of the second differential transistor pair to which the input signal is input at the gate is smaller than an absolute value of a threshold voltage of the transistor, the second current control circuit controls the gate voltages of the third and fourth current driver transistors so that at least one of the second output node and the second inversion output node is driven; and wherein the operational amplifier control section stops or limits an operating current of the second current control circuit.

13. The driver circuit as defined in claim 9, wherein the first current control circuit includes:

a third current source to which the second power supply voltage is supplied at one end;

a second conductivity type third differential transistor pair, sources of the transistors being connected with the other end of the third current source and the input signal and the output signal being respectively input to gates of the transistors; and first conductivity type fifth and sixth current driver transistors, the first power supply voltage being supplied to sources of the fifth and sixth current driver transistors, drains of the fifth and sixth current driver transistors being respectively connected with the drains of the transistors of the third differential transistor pair, and a gate and a drain of each of the fifth and sixth current driver transistors being connected;

wherein the drain of the transistor of the third differential transistor pair to which the input signal is input at the gate is connected with the gate of the second current driver transistor;

wherein the drain of the transistor of the third differential transistor pair to which the output signal is input at the gate is connected with the gate of the first current driver transistor; and wherein the operational amplifier control section stops or limits current of the third current source.

14. The driver circuit as defined in claim 10, wherein the first current control circuit includes:

a third current source to which the second power supply voltage is supplied at one end;

a second conductivity type third differential transistor pair, sources of the transistors being connected with the other end of the third current source and the input signal and the output signal being respectively input to gates of the transistors; and first conductivity type fifth and sixth current driver transistors, the first power supply voltage being supplied to sources of the fifth and sixth current driver transistors, drains of the fifth and sixth current driver transistors being respectively connected with the drains of the transistors of the third differential transistor pair, and a gate and a drain of each of the fifth and sixth current driver transistors being connected;

wherein the drain of the transistor of the third differential transistor pair to which the input signal is input at the gate is connected with the gate of the second current driver transistor;

wherein the drain of the transistor of the third differential transistor pair to which the output signal is input at the gate is connected with the gate of the first current driver transistor; and wherein the operational amplifier control section stops or limits current of the third current source.

15. The driver circuit as defined in claim 9, wherein the second current control circuit includes:

a fourth current source to which the first power supply voltage is supplied at one end;

a first conductivity type fourth differential transistor pair, sources of the transistors being connected with the other end of the fourth current source and the input signal and the output signal being respectively input to gates of the transistors; and second conductivity type seventh and eighth current driver transistors, the second power supply voltage being supplied to sources of the seventh and eighth current driver transistors, drains of the seventh and eighth current driver transistors being respectively connected with the drains of the transistors of the fourth differential transistor pair, and a gate and a drain of each of the seventh and eighth current driver transistors being connected;

wherein the drain of the transistor of the fourth differential transistor pair to which the input signal is input at the gate is connected with the gate of the fourth current driver transistor;

wherein the drain of the transistor of the fourth differential transistor pair to which the output signal is input at the gate is connected with the gate of the third current driver transistor; and wherein the operational amplifier control section stops or limits current of the fourth current source.

16. The driver circuit as defined in claim 10, wherein the second current control circuit includes:

a fourth current source to which the first power supply voltage is supplied at one end;

a first conductivity type fourth differential transistor pair, sources of the transistors being connected with the other end of the fourth current source and the input signal and the output signal being respectively input to gates of the transistors; and second conductivity type seventh and eighth current driver transistors, the second power supply voltage being supplied to sources of the seventh and eighth current driver transistors, drains of the seventh and eighth current driver transistors being respectively connected with the drains of the transistors of the fourth differential transistor pair, and a gate and a drain of each of the seventh and eighth current driver transistors being connected;

wherein the drain of the transistor of the fourth differential transistor pair to which the input signal is input at the gate is connected with the gate of the fourth current driver transistor;

wherein the drain of the transistor of the fourth differential transistor pair to which the output signal is input at the gate is connected with the gate of the third current driver transistor; and wherein the operational amplifier control section stops or limits current of the fourth current source.

17. An electro-optical device comprising:

a plurality of scan lines;

a plurality of data lines;

a plurality of pixels;

a scan line driver circuit which scans the scan lines; and the driver circuit as defined in claim 1 which drives the data lines.

18. An electronic instrument comprising the electro-optical device as defined in claim 17.

* * * * *